(12) United States Patent
Eto

(10) Patent No.: US 7,614,945 B2
(45) Date of Patent: Nov. 10, 2009

(54) STORAGE MEDIUM HAVING GAME PROGRAM STORED THEREON AND GAME APPARATUS

(75) Inventor: Keita Eto, Shibuya-ku (JP)

(73) Assignee: Nintendo Co., Ltd., Kyoto (JP)

( * ) Notice: Subject to any disclaimer, the term of this patent is extended or adjusted under 35 U.S.C. 154(b) by 852 days.

(21) Appl. No.: 11/328,183

(22) Filed: Jan. 10, 2006

(65) Prior Publication Data

US 2006/0252478 A1 Nov. 9, 2006

(30) Foreign Application Priority Data

May 9, 2005 (JP) .............................. 2005-135845

(51) Int. Cl.
*A63F 13/00* (2006.01)
(52) U.S. Cl. ........................................ 463/9
(58) Field of Classification Search ..................... 463/1, 463/7, 9–11, 30–32; 273/153 R
See application file for complete search history.

(56) References Cited

U.S. PATENT DOCUMENTS

| | | | | |
|---|---|---|---|---|
| 4,379,555 A | * | 4/1983 | Dean | 273/236 |
| 5,265,888 A | * | 11/1993 | Yamamoto et al. | 463/10 |
| 6,267,676 B1 | * | 7/2001 | Nagaoka | 463/43 |
| 6,352,475 B1 | * | 3/2002 | Mraovic | 463/9 |
| 6,354,939 B1 | * | 3/2002 | Morita et al. | 463/1 |
| 6,579,177 B2 | * | 6/2003 | Mraovic | 463/9 |
| 6,769,987 B1 | * | 8/2004 | Morita et al. | 463/31 |
| 6,827,645 B2 | * | 12/2004 | Morita et al. | 463/9 |
| 7,094,147 B2 | * | 8/2006 | Nakata et al. | 463/9 |
| 2002/0094854 A1 | * | 7/2002 | Morita et al. | 463/9 |
| 2006/0073863 A1 | * | 4/2006 | Hagiwara | 463/9 |

FOREIGN PATENT DOCUMENTS

| | | |
|---|---|---|
| JP | 4-54986 | 2/1992 |
| JP | 2001-38047 | 2/2001 |

* cited by examiner

*Primary Examiner*—Dmitry Suhol
*Assistant Examiner*—Robert Mosser
(74) *Attorney, Agent, or Firm*—Nixon & Vanderhye P.C.

(57) ABSTRACT

A color or brightness selected from a plurality of preset colors or brightnesses is set for each of a plurality of puzzle elements, and the plurality of puzzle elements are located and displayed on display means. A color or brightness selected from the plurality of preset colors or brightnesses is set for a cursor, and the cursor is located at the position of one of the puzzle elements selected by the cursor. When a predetermined operation signal is input, the color or brightness of the selected puzzle element is changed based on the color or brightness of the cursor and the color or brightness of the selected puzzle element. When a predetermined number of continuously arranged puzzle elements are of the same color or brightness, such puzzle elements are erased and new puzzle elements are located and displayed on the display means.

11 Claims, 18 Drawing Sheets

F I G. 7
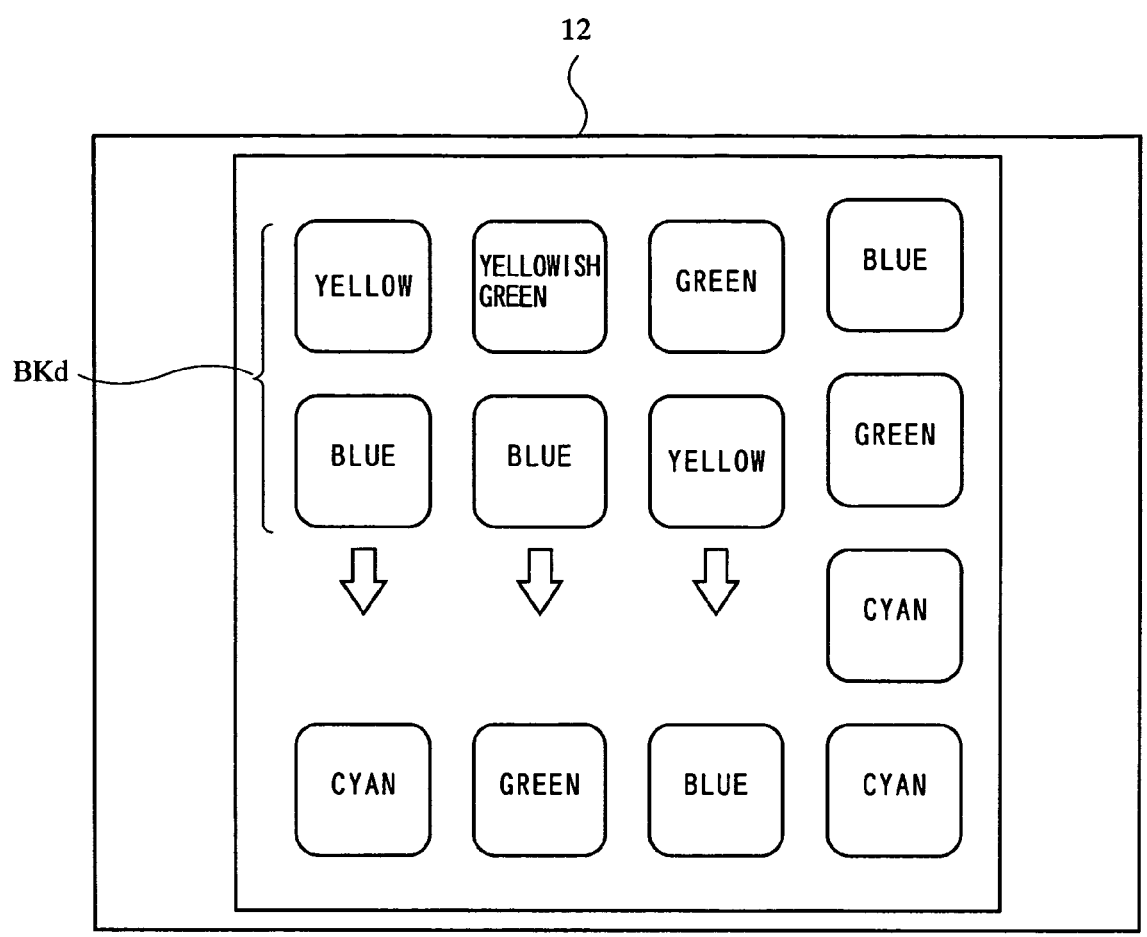

F I G. 1 0
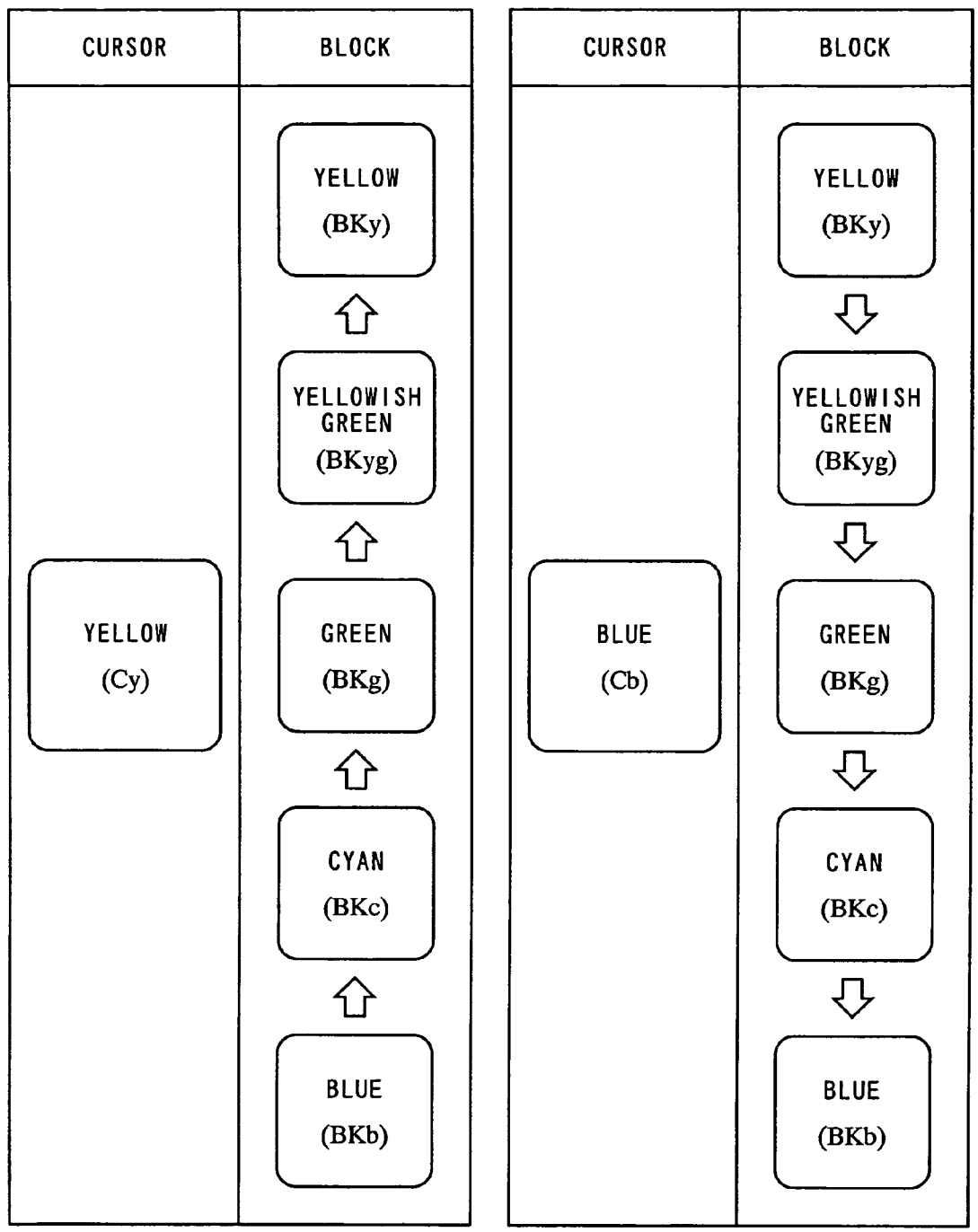

| COLOR OF CURSOR / COLOR OF BLOCK | YELLOW (Cy) | BLUE (Cb) |
|---|---|---|
| YELLOW (BKy) | NO COLOR CHANGE | →YELLOWISH GREEN (BKyg) |
| YELLOWISH GREEN (BKyg) | →YELLOW (BKy) | →GREEN (BKg) |
| GREEN (BKg) | →YELLOWISH GREEN (BKyg) | →CYAN (BKc) |
| CYAN (BKc) | →GREEN (BKg) | →BLUE (BKb) |
| BLUE (BKb) | →CYAN (BKc) | NO COLOR CHANGE |

| COLOR OF CURSOR / COLOR OF BLOCK | YELLOW (Cy) | BLUE (Cb) | RED (Cr) |
|---|---|---|---|
| YELLOW (BKy) | NO COLOR CHANGE | →YELLOWISH GREEN (BKyg) | →YELLOWISH ORANGE (BKyo) |
| YELLOWISH GREEN (BKyg) | →YELLOW (BKy) | →GREEN (BKg) | →GRAY (BKx) |
| GREEN (BKg) | →YELLOWISH GREEN (BKyg) | →CYAN (BKc) | →GRAY (BKx) |
| CYAN (BKc) | →GREEN (BKg) | →BLUE (BKb) | →GRAY (BKx) |
| BLUE (BKb) | →CYAN (BKc) | NO COLOR CHANGE | →VIOLET (BKv) |
| VIOLET (BKv) | →GRAY (BKx) | →BLUE (BKb) | →PURPLE (BKp) |
| PURPLE (BKp) | →GRAY (BKx) | →VIOLET (BKv) | →MAGENTA (BKm) |
| MAGENTA (BKm) | →GRAY (BKx) | →PURPLE (BKp) | →RED (BKr) |
| RED (BKr) | REDDISH ORANGE (BKro) | →MAGENTA (BKm) | NO COLOR CHANGE |
| REDDISH ORANGE (BKro) | →ORANGE (BKo) | →GRAY (BKx) | →RED (BKr) |
| ORANGE (BKo) | →YELLOWISH ORANGE (BKyo) | →GRAY (BKx) | REDDISH ORANGE (BKro) |
| YELLOWISH ORANGE (BKyo) | →YELLOW (BKy) | →GRAY (BKx) | →ORANGE (BKo) |

F I G. 1 8
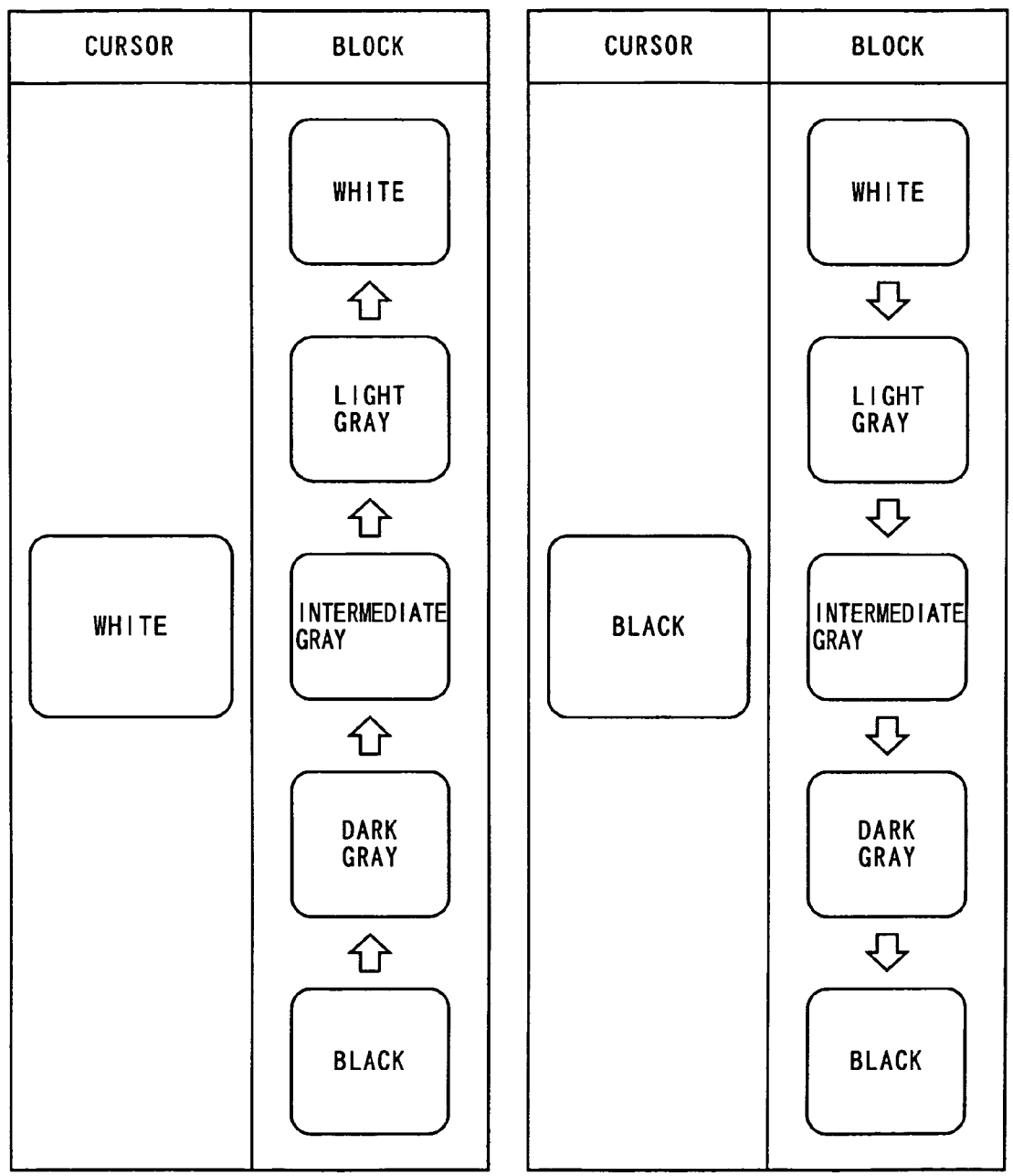

US 7,614,945 B2

STORAGE MEDIUM HAVING GAME PROGRAM STORED THEREON AND GAME APPARATUS

BACKGROUND OF THE INVENTION

1. Field of the Invention

The present invention relates to a storage medium storing a game program therein and a game apparatus for executing such a game program, and more specifically to a storage medium storing a puzzle game program therein for displaying a plurality of blocks on a screen and erasing the blocks in accordance with a predetermined rule and a puzzle game apparatus for executing such a puzzle game program.

2. Description of the Background Art

Conventionally, as disclosed in, for example, Japanese Laid-Open Patent Publication No. 4-54986 (hereinafter, referred to as "patent document 1") and Japanese Laid-Open Patent Publication No. 2001-38047 (hereinafter, referred to as "patent document 2"), games of displaying a plurality of puzzle elements such as blocks or panels on a game screen and erasing the puzzle elements in accordance with a predetermined rule have been proposed.

A game apparatus disclosed in patent document 1 presents a so-called object dropping games, in which puzzle elements fall down from the top of a game screen. In the game specifically disclosed in patent document 1, the player is to manipulate capsule-like puzzle elements, each formed of two areas of different colors, to fall down such that same color areas are piled up. The puzzle elements disappear in accordance with how the same color areas are piled up.

A three-dimensional puzzle game apparatus disclosed in patent document 2 presents a game in which a plurality of randomly colored panels are elevated from the bottom of a game screen. In the game specifically disclosed in patent document 2, the player is to replace adjacent panels with each other such that same color panels are adjacent to with each other. The panels which are thus contiguously positioned are erased.

In both of the game programs executed by the game apparatuses disclosed in patent documents 1 and 2, the player is to directly manipulate the puzzle elements to move on the game screen. The player plays the game until he/she will fall into the situation where no more puzzle elements can be displayed on the game screen in any minute. Such a game rule has been used ever since general object dropping games were first created. The games disclosed in patent document 1 and 2 both adopt this rule in a more complicated manner. Therefore, these games cannot be easily played by beginners.

SUMMARY OF THE INVENTION

Therefore, an object of the present invention is to provide a storage medium having stored therein a game program of a puzzle game which is played in accordance with a new rule so as to be enjoyable even by a beginner, and a game apparatus for executing such a game program. Another object of the present invention is to provide a storage medium having stored therein a game program of a game which provides the player with a new type of fun of predicting a color change of a puzzle element with respect to the color of the cursor operated by the player, and a game apparatus for executing such a game program.

The present invention has the following features to attain the object mentioned above. The reference numerals, step numbers (the term "step" is represented as "S" and combined with a numeral representing the step number), figure numbers and the like in parentheses in this section of the specification indicate the correspondence with the embodiment described later for easier understanding of the present invention, and do not limit the present invention in any way.

A first aspect of the present invention is directed to a storage medium having stored therein a game program (P1 through P10) executable by a computer (31) of a game apparatus (10) for displaying a game screen on display means (12) in accordance with an operation signal (D1) which is output from operation means (13) operated by a player. The game program causes the computer to execute a puzzle element color setting step (S51), a puzzle element display step (S53), a cursor color setting step (S51), a cursor display step (S53), a puzzle element color changing step (S54 through S57), a cursor color changing step (S84, S85), and a puzzle element display updating step (S62). The puzzle element color setting step sets a color selected from a plurality of preset colors (FIG. 10, FIG. 13) as a color of each of a plurality of puzzle elements (BK), and stores data (D33) representing the color on a memory (32). The puzzle element display step allocates the plurality of puzzle elements to a predetermined area (D31) and displays each of the plurality of puzzle elements in the color set on the display means (FIG. 4 through FIG. 6). The cursor color setting step sets a color selected from the plurality of preset colors indicated by a color of a cursor (C) for selecting one of the plurality of puzzle elements located in the predetermined area, and stores data (D22) representing the color on a memory. The cursor display step allocates the cursor at a position corresponding to the operation signal and displays the cursor in the color set therefor on the display means (FIG. 4 through FIG. 6, FIG. 8, FIG. 9). When the cursor is located at the position corresponding to one of the plurality of puzzle elements selected by the cursor and a predetermined operation signal is input from the operation means (pressing on the A button), the puzzle element color changing step changes the color of the puzzle element selected by the cursor (FIG. 6) based on the color of the cursor and the color of the puzzle element (D4). The cursor color changing step changes the color of the cursor to another color selected from the plurality of preset colors based on a predetermined condition. When at least a predetermined number of continuously arranged puzzle elements among the plurality of puzzle elements allocated in the predetermined area are of the same color, the puzzle element display updating step erases the continuously arranged puzzle elements, arranges new puzzle elements (BKn) in the predetermined area each in a color selected from the plurality of preset colors, and displays the new puzzle elements on the display means (FIG. 7, FIG. 8).

In a second aspect based on the first aspect, the puzzle element color changing step includes the step of changing the color of the puzzle element selected by the cursor to a color which is selected from the plurality of preset colors and is closer to the color of the cursor than the color currently set for the puzzle element (FIG. 10, FIG. 11, FIG. 13, FIG. 14).

In a third aspect based on the second aspect, the cursor color setting step and the cursor color changing step include the step of selecting a color from any two colors among the plurality of preset colors (yellow, blue) as a color of the cursor. The puzzle element color setting step and the puzzle element color changing step include the step of selecting a color, as a color of the puzzle element selected by the cursor, from the two colors selected by the cursor color setting step and the cursor color changing step and another color among the plurality of preset colors which is median between the two colors (yellowish green, green, cyan).

In a fourth aspect based on the second aspect, a plurality of the preset colors have a relationship of forming a color circle (FIG. 13). The cursor color setting step and the cursor color changing step include the step of selecting a color from any three colors among the plurality of preset colors in the color circle (yellow, blue, red) as a color of the cursor. The puzzle element color setting step and the puzzle element color changing step include the step of selecting a color from all the plurality of preset colors in the color circle (twelve colors of yellow, yellowish green, green, cyan, blue, violet, purple, magenta, red, reddish orange, orange, and yellowish orange) as a color of the puzzle element selected by the cursor.

In a fifth aspect based on the fourth aspect, the puzzle element color changing step includes the step of, when the color of the cursor and the color of the puzzle element selected by the cursor are complementary to each other in the color circle, changing the color of the puzzle element selected by the cursor to an achromatic color (gray) which is different from any of the plurality of preset colors in the color circle (S66). The game program further causes the computer to execute a puzzle element state changing step (S66). The puzzle element state changing step changes the puzzle element which has been changed to have the achromatic color to a puzzle element, the color of which cannot be changed by the puzzle element color changing step (BKx).

In a sixth aspect based on the first aspect, the puzzle element color changing step includes the step of, when the color of the cursor and the color of the puzzle element selected by the cursor are the same as each other (Yes in S55), keeping the color of the puzzle element selected by the cursor unchanged (S57).

In a seventh aspect based on the first aspect, the puzzle element display updating step includes the step of moving other puzzle elements (BKd) among the plurality of puzzle elements in a predetermined direction (downward) so as to fill a gap generated in the predetermined area by the erasure of the continuously arranged puzzle elements. The game program further causes the computer to execute a puzzle element state changing step. The puzzle element state changing step changes a puzzle element among the plurality of puzzle elements which has not been moved for at least a predetermined time duration (Yes in S65) to a puzzle element, the color of which cannot be changed by the puzzle element color changing step.

In an eighth aspect based on the seventh aspect, the game program further causes the computer to execute a puzzle element state change timing display step (S53, FIG. 12). The puzzle element state change timing display step displays a time at which the puzzle element is to be changed by the puzzle element state changing step (block images BKim changed in accordance with the display form change speed data D34) on the display means.

A ninth aspect of the present invention is directed to a storage medium having stored therein a game program executable by a computer of a game apparatus for displaying a game screen on display means in accordance with an operation signal which is output from operation means operated by a player. The game program causes the computer to execute a puzzle element brightness setting step, a puzzle element display step, a cursor brightness setting step, a cursor display step, a puzzle element brightness changing step, a cursor brightness changing step, and a puzzle element display updating step. The puzzle element brightness setting step sets a brightness selected from a plurality of preset brightnesses as a brightness of each of a plurality of puzzle elements (FIG. 18), and stores data representing the brightness on a memory. The puzzle element display step locates the plurality of puzzle elements in a predetermined area and displays each of the plurality of puzzle elements in the brightness set therefor on the display means. The cursor brightness setting step sets a brightness selected from the plurality of preset brightnesses as a brightness of a cursor for selecting one of the plurality of puzzle elements located in the predetermined area (FIG. 18), and stores data representing the brightness on a memory. The cursor display step locates the cursor at a position corresponding to the operation signal and displays the cursor in the brightness set therefor on the display means. When the cursor is located at the position corresponding to one of the plurality of puzzle elements selected by the cursor and a predetermined operation signal is input from the operation means, the puzzle element brightness changing step changes the brightness of the puzzle element selected by the cursor based on the brightness of the cursor and the brightness of the puzzle element. The cursor brightness changing step changes the brightness of the cursor to another brightness selected from the plurality of preset brightnesses based on a predetermined condition. When at least a predetermined number of continuously arranged puzzle elements among the plurality of puzzle elements located in the predetermined area are of the same brightness, the puzzle element display updating step erases the continuously arranged puzzle elements, arranges new puzzle elements in the predetermined area each in a brightness selected from the plurality of preset brightnesses, and displays the new puzzle elements on the display means.

A tenth aspect of the present invention is directed to a game apparatus for displaying a game screen on display means in accordance with an operation signal which is output from operation means operated by a player. The game apparatus comprises storage means (32), puzzle element color setting means, puzzle element display means, cursor color setting means, cursor display means, puzzle element color changing means, cursor color changing means, and puzzle element display updating means. The puzzle element color setting means sets a color selected from a plurality of preset colors as a color of each of a plurality of puzzle elements, and stores data representing the color on a memory. The puzzle element display means locates the plurality of puzzle elements in a predetermined area and displays each of the plurality of puzzle elements in the color set therefor on the display means. The cursor color setting means sets a color selected from the plurality of preset colors as a color of a cursor for selecting one of the plurality of puzzle elements located in the predetermined area, and stores data representing the color on a memory. The cursor display means locates the cursor at a position corresponding to the operation signal and displays the cursor in the color set therefor on the display means. When the cursor is located at the position corresponding to one of the plurality of puzzle elements selected by the cursor and a predetermined operation signal is input from the operation means, the puzzle element color changing means changes the color of the puzzle element selected by the cursor based on the color of the cursor and the color of the puzzle element. The cursor color changing means changes the color of the cursor to another color selected from the plurality of preset colors based on a predetermined condition. When at least a predetermined number of continuously arranged puzzle elements among the plurality of puzzle elements located in the predetermined area are of the same color, the puzzle element display updating means erases the continuously arranged puzzle elements, arranges new puzzle elements in the predetermined area in a color selected from the plurality of preset colors respectively, and displays the new puzzle elements on the display means.

An eleventh aspect of the present invention is directed to a game apparatus for displaying a game screen on display means in accordance with an operation signal which is output from operation means operated by a player. The game apparatus comprises storage means, puzzle element brightness setting means, puzzle element display means, cursor brightness setting means, cursor display means, puzzle element brightness changing means, cursor brightness changing means, and puzzle element display updating means. The puzzle element brightness setting means sets a brightness selected from a plurality of preset brightnesses as a brightness of each of a plurality of puzzle elements, and stores data representing the brightness on a memory. The puzzle element display means locates the plurality of puzzle elements in a predetermined area and displays each of the plurality of puzzle elements in the brightness set therefor on the display means. The cursor brightness setting means sets a brightness selected from the plurality of preset brightnesses as a brightness of a cursor for selecting one of the plurality of puzzle elements located in the predetermined area, and stores data representing the brightness on a memory. The cursor display means locates the cursor at a position corresponding to the operation signal and displays the cursor in the brightness set therefor on the display means. When the cursor is located at the position corresponding to one of the plurality of puzzle elements selected by the cursor and a predetermined operation signal is input from the operation means, the puzzle element brightness changing means changes the brightness of the puzzle element selected by the cursor based on the brightness of the cursor and the brightness of the puzzle element. The cursor brightness changing means changes the brightness of the cursor to another brightness selected from the plurality of preset brightnesses based on a predetermined condition. When at least a predetermined number of continuously arranged puzzle elements among the plurality of puzzle elements located in the predetermined area are of the same brightness, the puzzle element display updating means erases the continuously arranged puzzle elements, arranges new puzzle elements in the predetermined area each in a brightness selected from the plurality of preset brightnesses, and displays the new puzzle elements on the display means.

According to the first aspect of the invention, a puzzle game which is played with a new rule, for example, a puzzle game of erasing puzzle elements by making the colors of the puzzle elements the same using the puzzle elements, the colors of which are changed in accordance with a predetermined operation based on the color of the cursor and the color of each puzzle element, can be realized. The color of the cursor is an indicator regarding the color change of the blocks, but the colors of the blocks cannot be made the same easily because the color of the cursor also changes. Therefore, the player needs to play the game in consideration of the color of the cursor as well as in mere consideration of the colors of the blocks, which makes the puzzle game more exciting to play. The player can easily change the color of a block merely by putting the cursor on the block and performing a predetermined operation. The puzzle game is sufficiently easy to be enjoyed even by a beginner.

According to the second aspect of the invention, the color of each block is changed so as to be closer to the color of the cursor in response to a predetermined operation. The colors of the blocks are changed with respect to the color of the cursor with a certain regularity. Therefore, the player can enjoy the game with a new type of fun of solving the puzzle while predicting the color change of the blocks to some extent.

According to the third aspect of the invention, two colors which can be set for the cursor and a color which is median between the two colors are set as the color of the puzzle element. The two colors at both ends of the color change of the puzzle element are set for the cursor. The player can enjoy the color change of the puzzle element on the game screen as if the color of the puzzle element was gradually mixed with the color of the cursor. Since the two colors at both ends of the color change are set for the cursor, the player can more easily predict the change of the puzzle element.

According to the fourth aspect of the invention, the color of the cursor is selected from three colors among the plurality of colors in the color circle. The player can enjoy the color change of the puzzle element on the game screen as if the color of the puzzle element was gradually mixed with the color of the cursor, with a wider variation. By increasing the number of colors which can be set for the cursor, the color change of the puzzle element becomes more complicated and thus the difficulty level of the puzzle game can be increased.

According to the fifth aspect of the invention, when the color of the cursor and the color of the puzzle element are complementary to each other, the puzzle element is changed to an achromatic puzzle element, which acts as an obstructing factor against the smooth progress of the puzzle game. Therefore, the player cannot necessarily change the color in the way he/she wishes, and is provided with a new feeling that he/she is running out of time.

According to the sixth aspect of the invention, by adding a certain degree of limitation on the color change of the puzzle element, the puzzle game provides a wider variety of strategy.

According to the seventh aspect of the invention, a puzzle element is changed to a puzzle element obstructing the smooth progress of the game unless being moved at a certain frequency. Therefore, the player is provided with a feeling that he/she is running out of time, which is different from the feeling of crisis provided by general addition of new puzzle elements. This makes the puzzle game more exciting to play.

According to the eighth aspect of the invention, the time at which the puzzle element will be changed to an obstructing puzzle element is displayed. By this arrangement, the player gets gradually more and more tense when the puzzle elements are not erased smoothly. This makes the puzzle game more exciting to play.

According to the ninth aspect of the invention, the puzzle elements and the cursor are each displayed in one of a plurality of brightnesses. With such an arrangement also, the same effect as that provided by the first aspect is provided. For example, even where the puzzle elements and the cursor are each displayed in an achromatic color, the same effect as that provided by the first aspect is provided.

The present invention can also be realized as a game apparatus for executing the game program stored on the above-described storage medium. In this case also, the above-described effects are provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an example of the game screen representing erasure of blocks BK and blocks BKd which are about to fall down;

FIG. 10 shows an example of color change of the blocks BK when the cursor C is displayed in one of two different colors as a cursor Cy or Cb;

FIG. 11 shows an example of block color display change table data D4 which describes the color change of the blocks BK shown in FIG. 10;

FIG. 14 shows an example of the block color display change table data D4 which describes the color change of the blocks BK shown in FIG. 13;

FIG. 18 shows an example of color (brightness) change when the cursor is displayed in either black or white.

DESCRIPTION OF THE PREFERRED EMBODIMENTS

Figure 1:
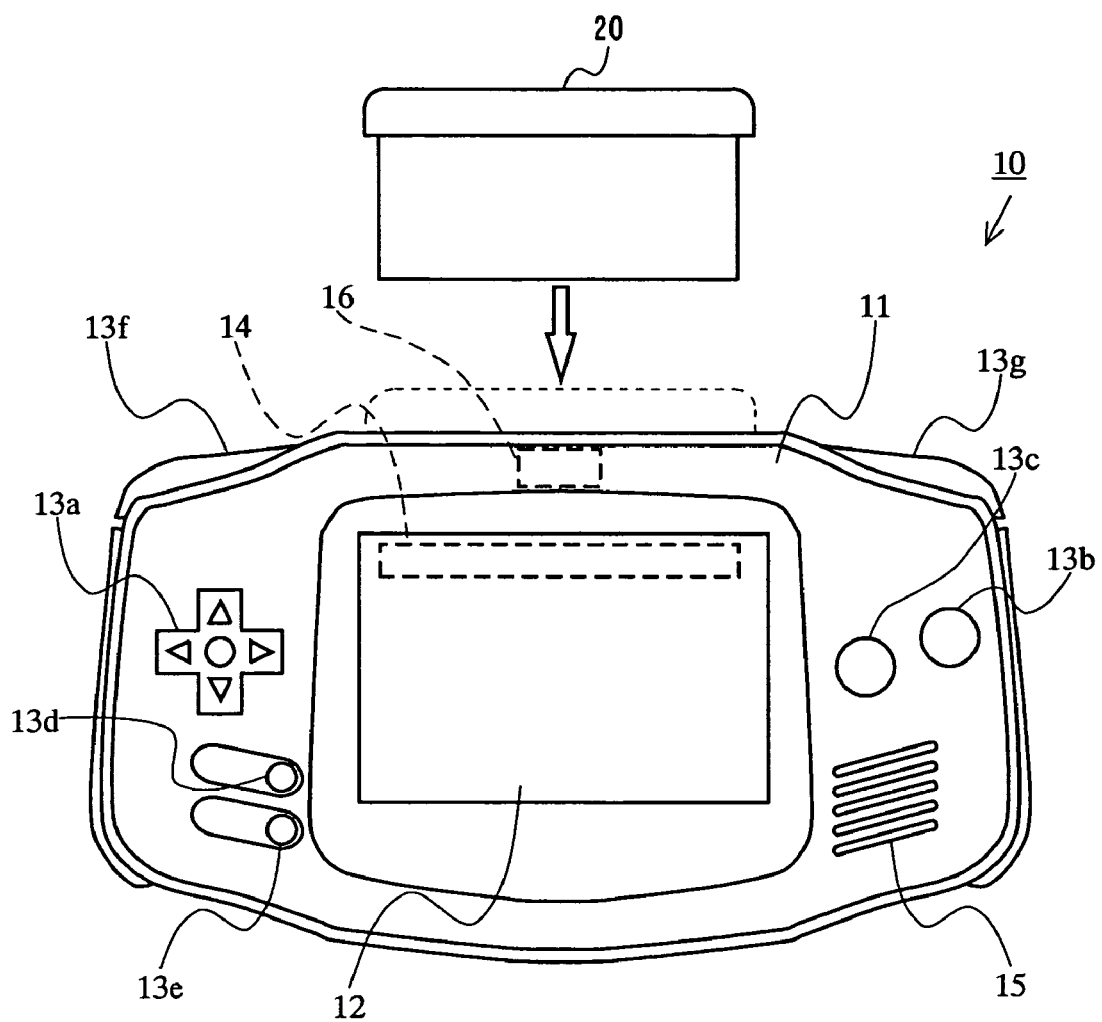
FIG. 1 is an external view of a mobile game apparatus according to one embodiment of the present invention.

With reference to the drawings, a structure of a game apparatus according to one embodiment of the present invention will be described. FIG. 1 is an external view of a mobile game apparatus 10 according to one embodiment of the present invention. The present invention is not limited to the mobile game apparatus 10, and is also applicable to installation type game apparatuses and general computer systems for executing game programs.

As shown in FIG. 1, the game apparatus 10 uses a game cartridge (hereinafter, referred to simply as the "cartridge") 20 as an information storage medium for a game program or the like. When the cartridge 20 is attached to the game apparatus 10 in the direction of the arrow shown in FIG. 1, a semiconductor memory or the like (a program ROM 21 and a backup RAM 22 shown in FIG. 2) accommodated in the cartridge 20 is electrically connected to the game apparatus 10. The game apparatus 10 has a cartridge insertion hole (not shown) in an upper rear part thereof, into which the cartridge 20 can be detachably inserted. A connector 14 (represented in FIG. 1 with thick dashed line) to be electrically connected to the cartridge 20 is provided in the vicinity of the bottom of the insertion hole. On a rear surface of the game apparatus 10, a connector 16 (represented in FIG. 1 with thick dashed line) to be connected to a cable is provided for communicating the game apparatus 10 with another game apparatus.

The game apparatus 10 includes a housing 11. In a central area of one main surface of the housing 11 (the surface shown in FIG. 1), a liquid crystal display (LCD) 12 is provided. In areas flanking the LCD 12 and side surfaces of the housing 11, a speaker 15 and operation switches 13a through 13g (also referred to collectively as "operation switches 13") are provided. The instructions provided by the operation switches 13a through 13g differ depending on the contents of the game program executed by the game apparatus 10. Typically, the operation switch (cross-shaped switch) 13a provides an instruction on the moving direction, the operation switches 13b and 13c provide an instruction on the motion such as "A" or "B", the operation switches 13d and 13e provide an instruction on the motion such as "START" or "SELECT", and the operation switches 13f and 13g provide an instruction on the motion such as "L" or "R". For example, in the game processing described later, the operation switch 13a is mainly used for moving a cursor C. The operation switch 13b is mainly used for indicating that it is determined to perform a color change operation on a block BK selected by the cursor C. Especially, the operation switch 13b is also referred to as "A button", and the operation switch 13c is also referred to as "B button". The other switches may sometimes be used in the game, but will not be described in detail here.

Figure 2:
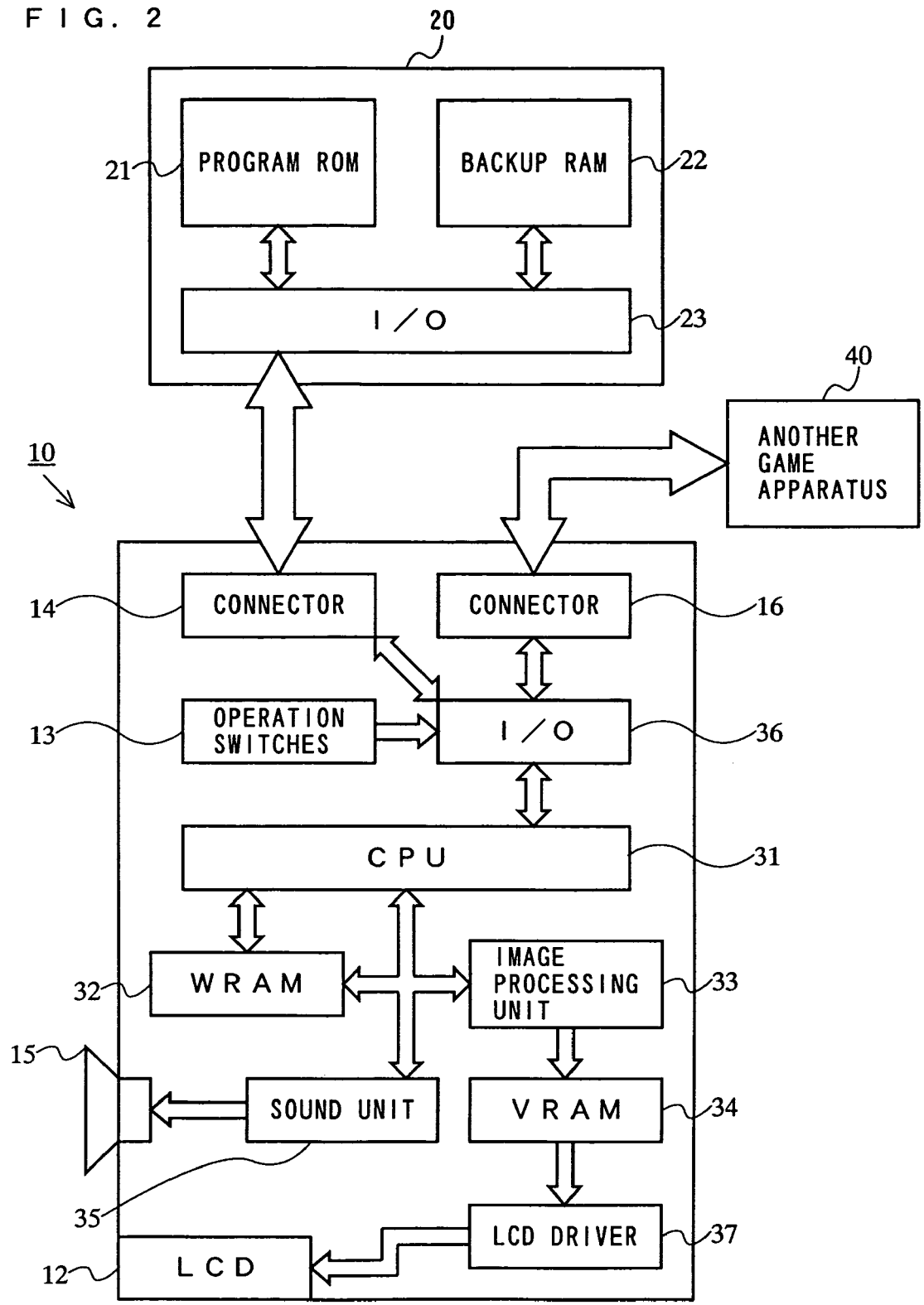
FIG. 2 is a function block diagram of a game apparatus 10 and a cartridge 20 shown in FIG. 1.

FIG. 2 is a function block diagram of the game apparatus 10 and the cartridge 20. As shown in FIG. 2, the game apparatus 10 includes a central processing unit (CPU) 31, a working RAM (WRAM) 32, an image processing unit 33, a video RAM (VRAM) 34, a sound unit 35, an input/output unit (I/O) 36, and an LCD driver 37 in addition to the elements described above with reference to FIG. 1. The cartridge 20 includes the program ROM 21, the backup RAM 22, and an I/O 23.

The program ROM 21 has stored therein a game program describing the contents of a game to be played using the game apparatus 10, image data thereof, and the like. Based on the game program, the CPU 31 operates in a game processing mode. The I/O 36 is connected to the connectors 14 and 16, the operation switches 13, and the CPU 31. The I/O 36 outputs data, which is input from the connectors 14 and 16 and the operation switches 13, to the CPU 31; and outputs data, which is input from the CPU 31, to the connectors 14 and 16. The connector 16 is communicatively connected to the game apparatus 10, and is also communicatively connectable to another game apparatus 40, both via a cable.

The CPU 31 processes a starting program stored on a boot ROM (not shown) and operates in the game processing mode based on the game program stored on the program ROM 21. When the cartridge 20 is attached to the game apparatus 10, the CPU 31 accesses the program ROM 21 via the I/O 36, the connector 14 and the I/O 23. The CPU 31 executes the game processing based on operation signals which are input by the operational switches 13 and the game program. The CPU 31 stores data obtained during the processing on the WRAM 32, and also temporarily stores image data on the VRAM 34 via the image processing unit 33.

When the CPU 31 operates in the game processing mode, the WRAM 32 has the game program, processing data and the like stored therein and is used as a storage area for the processing executed by the CPU 31 whenever necessary.

The sound unit 35 includes a D/A conversion circuit and an amplification circuit. The sound unit 35 converts sound data based on the processing result of the game program into a sound signal (analog signal), and amplifies and outputs the sound signal as a voice or a sound effect via the speaker 15 when necessary.

The image processing unit 33 executes image processing in response to an instruction from the CPU 31. The image processing unit 33 is formed of, for example, a semiconductor chip for performing calculations necessary for graphics display. The image processing unit 33 uses storage areas of the WRAM 32 and the VRAM 34 to execute the image processing. The image processing unit 33 generates game image data to be displayed on the screen of the LCD 12 using these storage areas, and outputs the game image data to the LCD 12 via the VRAM 34 when necessary. On the VRAM 34, the image data processed by the image processing unit 34 is temporarily stored. The LCD driver 37 is connected to the VRAM 34 and the LCD 12, and performs display control so that the image data stored on the VRAM 34 is displayed on the screen of the LCD 12.

The program ROM 21 in the cartridge 20 has the game program and various types of data used for the game program stored therein fixedly. On the backup RAM 22, the game data obtained by the execution of the game program and input via the I/O 23 is stored rewritably and in a non-volatile manner. The game data stored on the backup RAM 22 includes, for example, backup data representing how the game has been terminated. The backup RAM 22 may be formed of a flash memory or the like.

Figure 3:
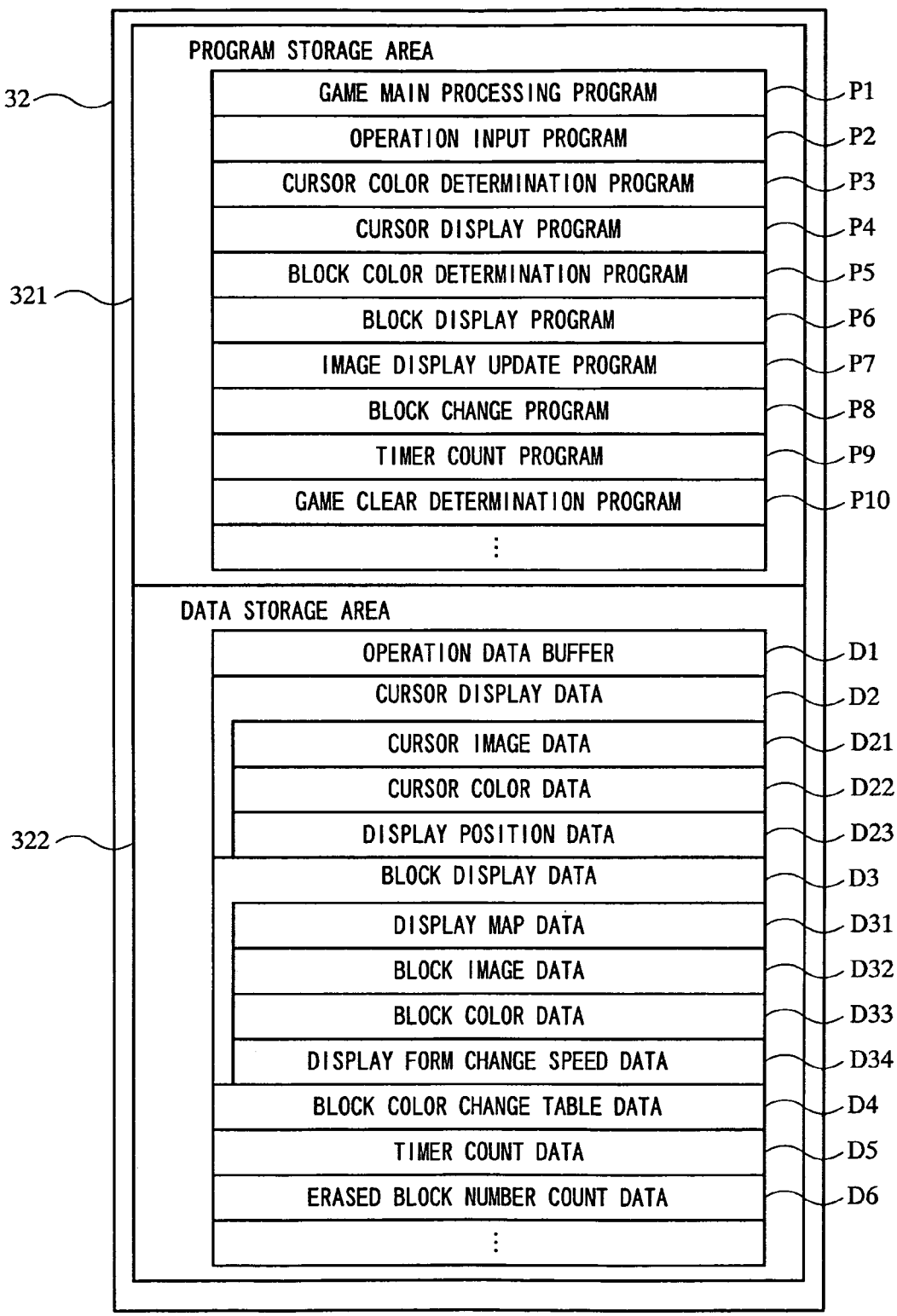
FIG. 3 shows programs and data stored in a WRAM 32 shown in FIG. 2.

FIG. 3 shows programs and data stored on the WRAM 32. The WRAM 32 has stored therein programs read from the program ROM 21 and temporary data generated during the game processing. As shown in FIG. 3, the following programs are stored in a program storage area 321 of the WRAM 32: a game main processing program P1, an operation input program P2, a cursor color determination program P3, a cursor display program P4, a block color determination program P5, a block display program P6, an image display update program P7, a block change program P8, a time count program P9, a game clear determination program P10, and the like.

The game main processing program P1 defines the entire game processing. By starting the execution of the game main processing program P1, the game processing (FIG. 15 and FIG. 16) is started. The operation input program P2 defines the processing of obtaining an operation signal from the operation switches 13 and storing the operation signal in a data storage area 322 (S52 in FIG. 15). The cursor color determination program P3 defines the processing of determining whether the state of the game fulfills the condition for changing the color of a cursor C displayed on the game screen, and if so, changing cursor color data D22 of the cursor C to another color (S84 and S85 in FIG. 17). The cursor display program P4 defines the processing of performing the control of displaying the cursor C on the game screen based on cursor display data D2 (S53 in FIG. 15). The block color determination program P5 defines the processing of comparing the cursor color data D22 and block color data D33 and changing the block color data D33 based on block color change table data D4 (S55 in FIG. 15 and S81 through S83 in FIG. 17). The block display program P6 defines the processing of performing the control of displaying a block BK on the game screen based on block display data D3 (S53 in FIG. 15). The image display update program P7 defines the processing of erasing or extinguishing a block BK from the game screen or moving a block BK based on the positional relationship of the block BK with the other blocks BK in accordance with the state of the game, and thus updating the image display (S61 and S62 in FIG. 16). The block change program P8 defines the processing of changing a block BK fulfilling a predetermined condition to a gray obstructing block BKx (S65 and S66 in FIG. 16). The timer count program P9 defines the processing of counting a time duration in which a block BK has not been changed and performing a calculation on display form change speed data D34 of each such block BK based on the counting result (S64 and S70 in FIG. 16). The game clear determination program P10 defines the processing of determining whether the game is to be over or the game has cleared in accordance with the state of the game (S64, S67 and S68 in FIG. 16).

In the data storage area 322 of the WRAM 32, the following is stored: an operation data buffer D1, the cursor display data D2, the block display data D3, the block color change table data D4, timer count data D5, erased block number count data D6 and the like. The cursor display data D2 includes cursor image data D21, the cursor color data D22 and display position data D23. The block display data D3 includes display map data D31, block image data D32, the block color data D33, and the display form change speed data D34, for each block BK.

The operation data buffer D1 is a storage area for storing, when necessary, operation signals which are input from the operation switches 13 via the I/O 36 or parameters calculated based on the operation signals. The cursor image data D21 is image data for displaying the cursor C on the game screen, and is object image data, the color of which is determined based on the cursor color data D22. The cursor color data D22 represents one of a plurality of colors (for example, two or three colors) set for the cursor C. Fixed RGB values of each color are provided in correspondence with each of the cursor color data D22. The display position data D23 represents the coordinates of the position on the game screen at which the cursor image data D21 is to be located. The display map data D31 is coordinate data provided for the entire game screen and acts as reference for generating the game screen on which a plurality of blocks BK are located. The display map data D31 includes coordinates of the position at which each of the plurality of blocks BK is located. The block image data D32 is image data for displaying each of the plurality of blocks BK on the game screen, and is object image data, the color of which is determined based on the block color data D33. The block image data D32 includes images of a plurality of patterns which have different display forms even though having the same display color. The block color data D33 represents one of a plurality of colors (for example, five or twelve colors) set for the blocks BK. Fixed RGB values of each color are provided in correspondence with each of the block color data D33. The display form change speed data D34 represents the speed at which the images of the plurality of patterns included in the block image data D32 are sequentially changed to present an animation display. The block color display change table data D4 is a data table describing the change of the block color data D33 in accordance with the color of the cursor and the color of the block. The timer count data D5 represents the time duration counted by the timer count program P9. The erased block number count data D5 represents the counted total number of the erased blocks BK.

Figure 4:
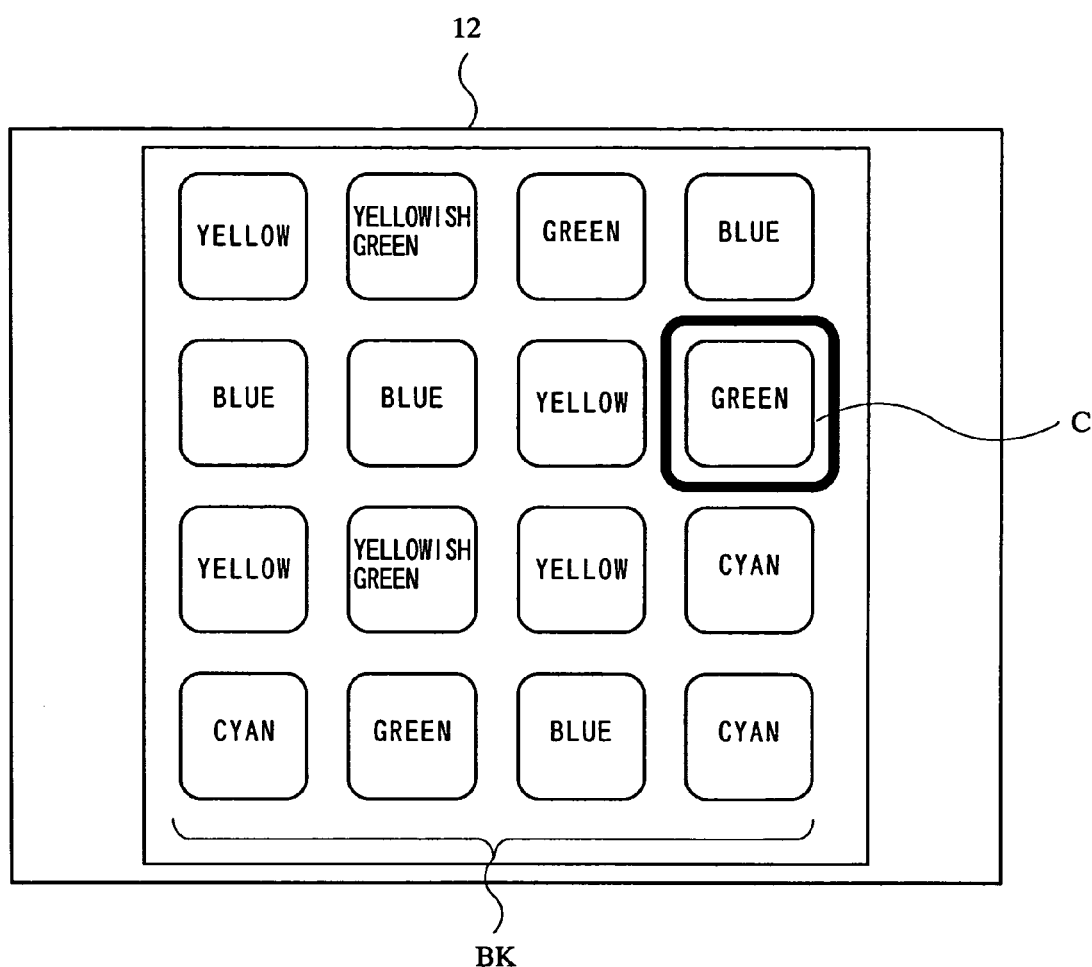
FIG. 4 shows an example of a game screen displayed on the screen of an LCD 12 by game processing executed by the game apparatus 10 shown in FIG. 1.
Figure 5:
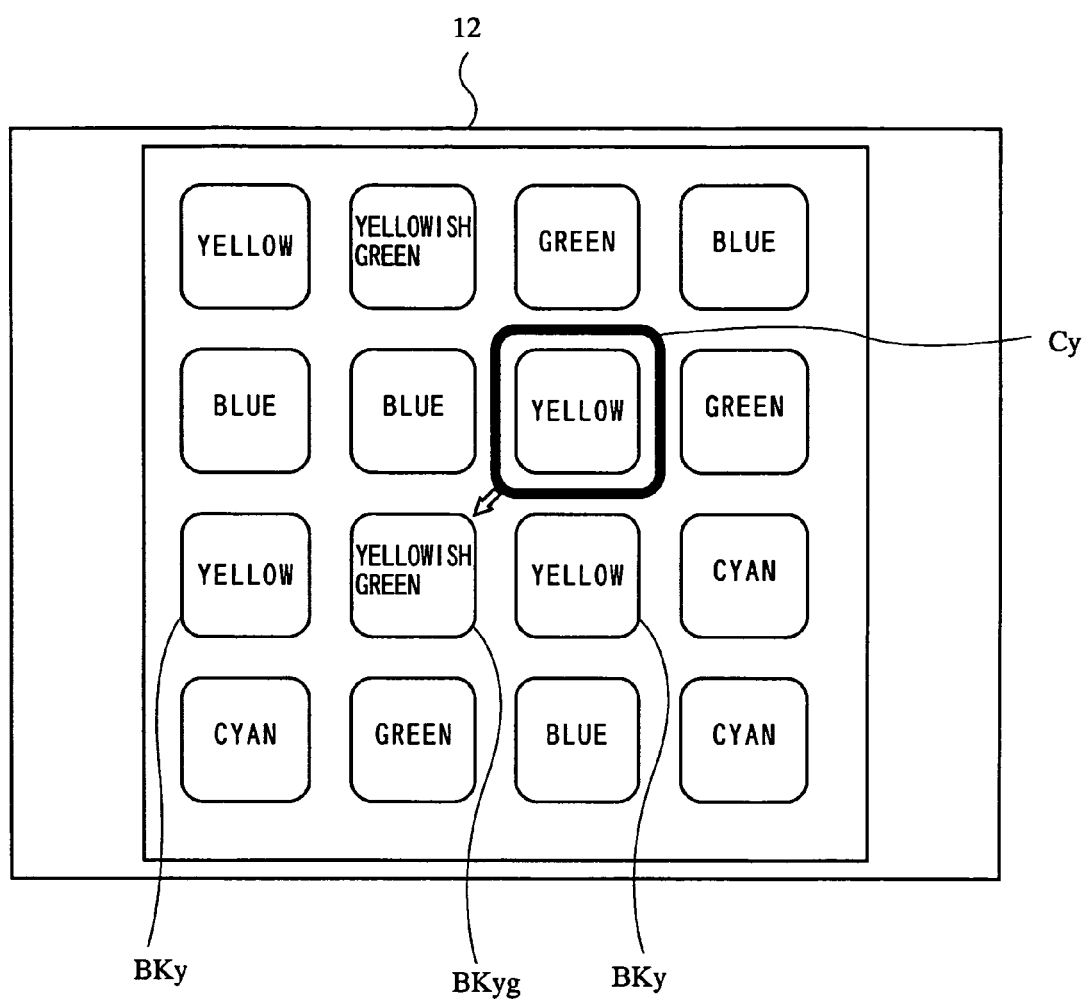
FIG. 5 shows an example of the game screen representing how a cursor C is moved to a block BK, the color of which is to be changed.
Figure 6:
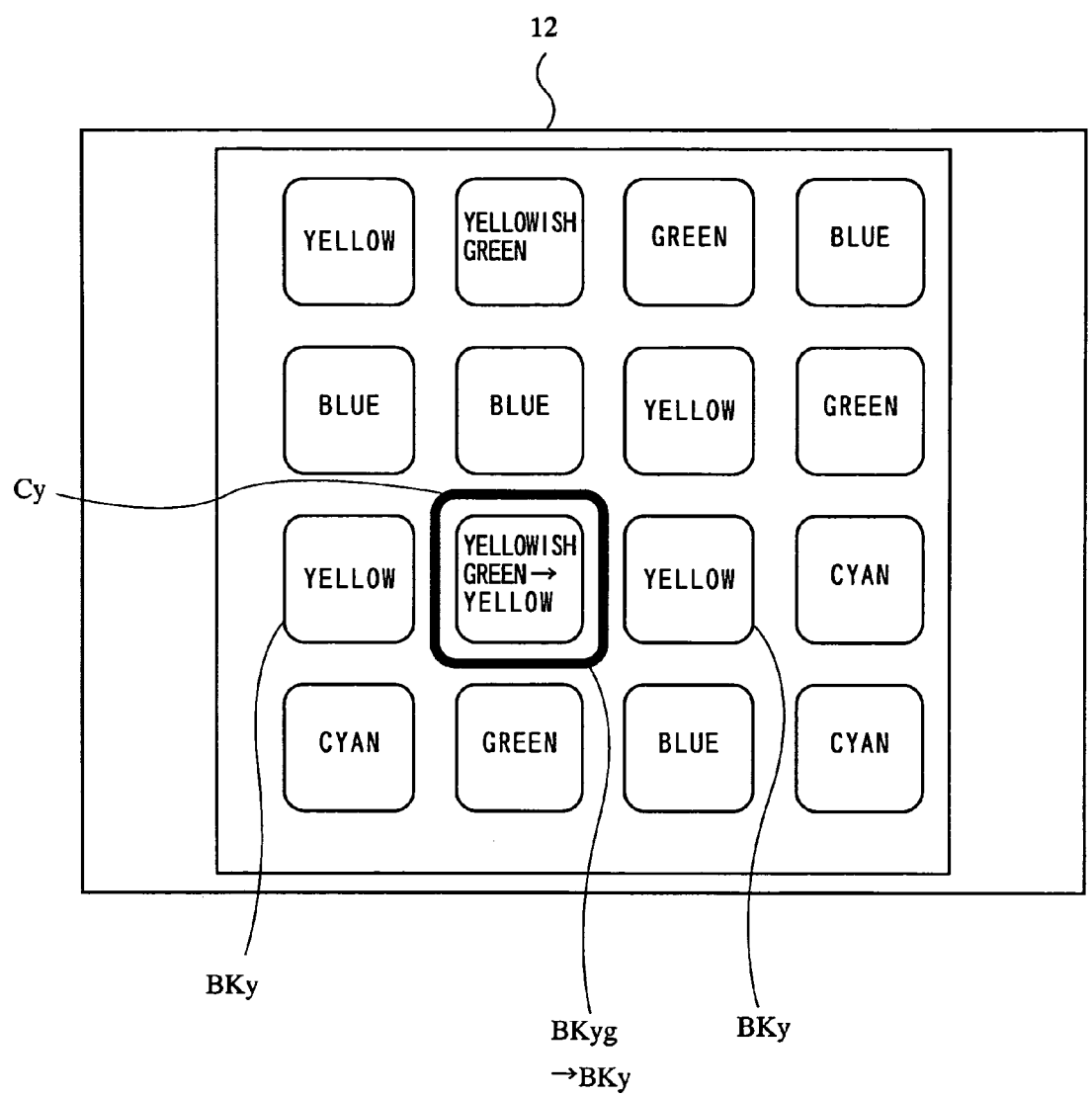
FIG. 6 shows an example of the game screen representing how the color of the block BK is changed when a color change operation is performed.
Figure 8:
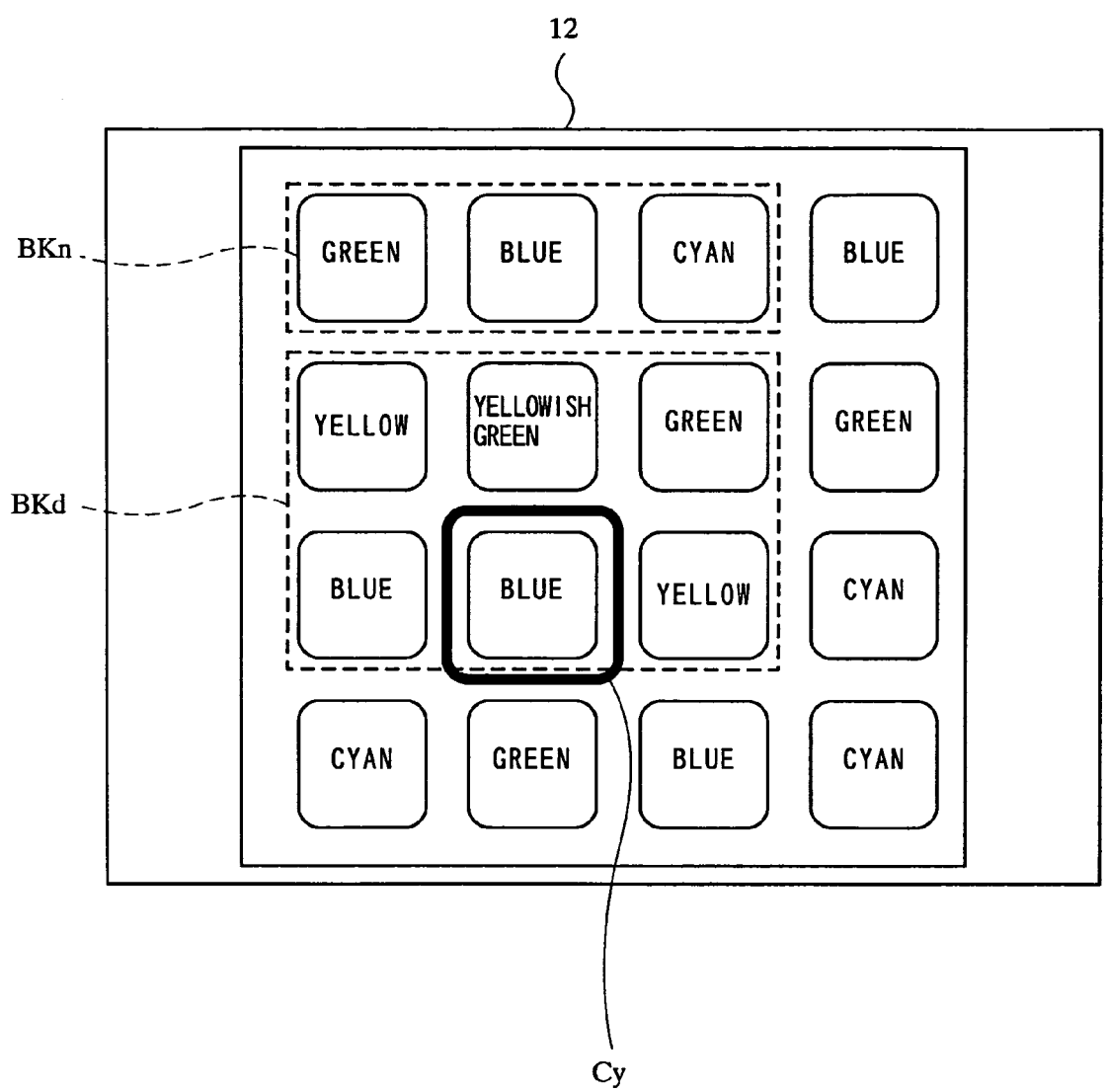
FIG. 8 shows an example of the game screen representing the blocks BKd which have fallen down and blocks BKn newly appearing at the top of the game screen.
Figure 9:
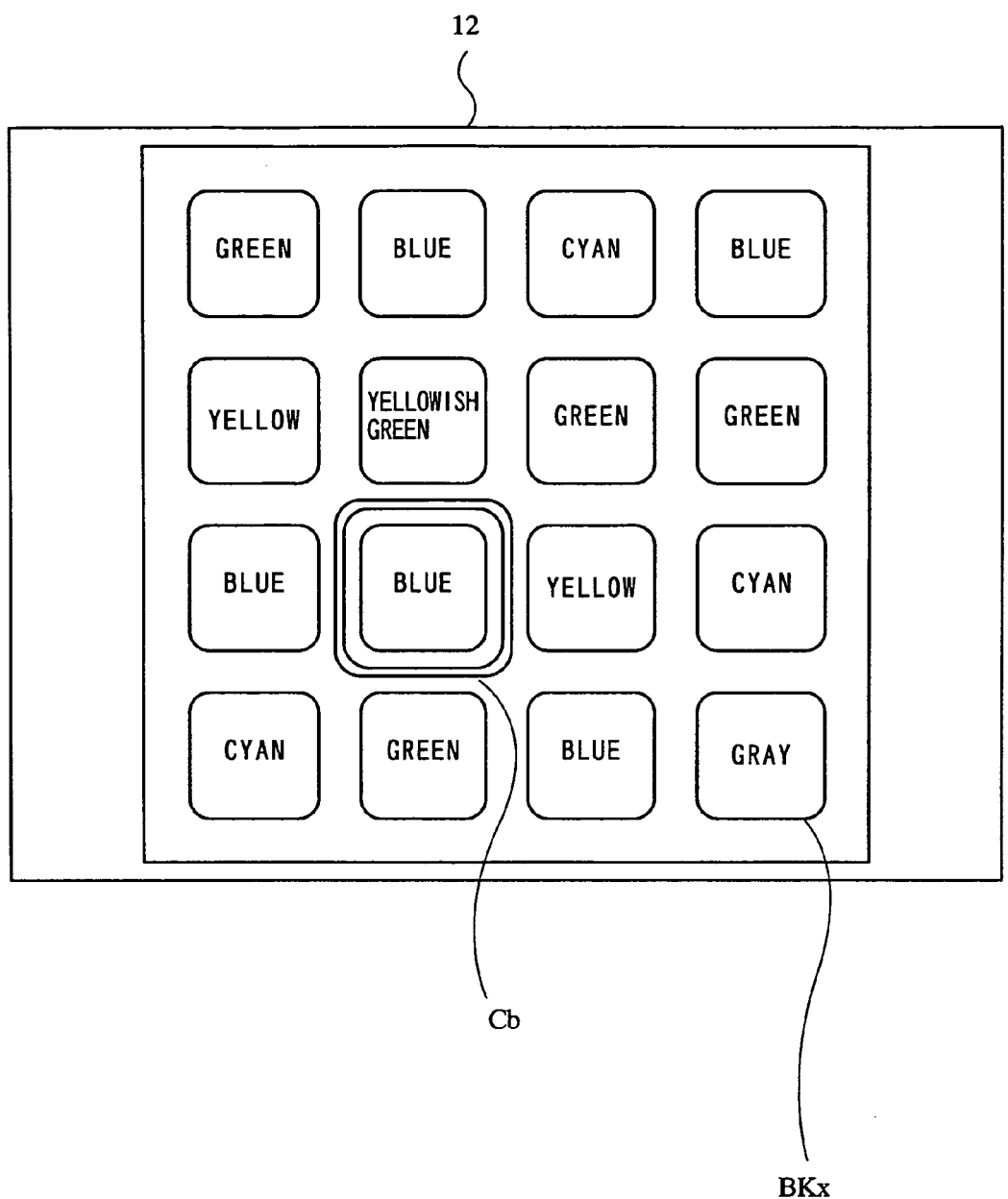
FIG. 9 shows an example of the game screen representing the cursor C, the color of which has been changed, and an obstructing block BKx.
Figure 12:
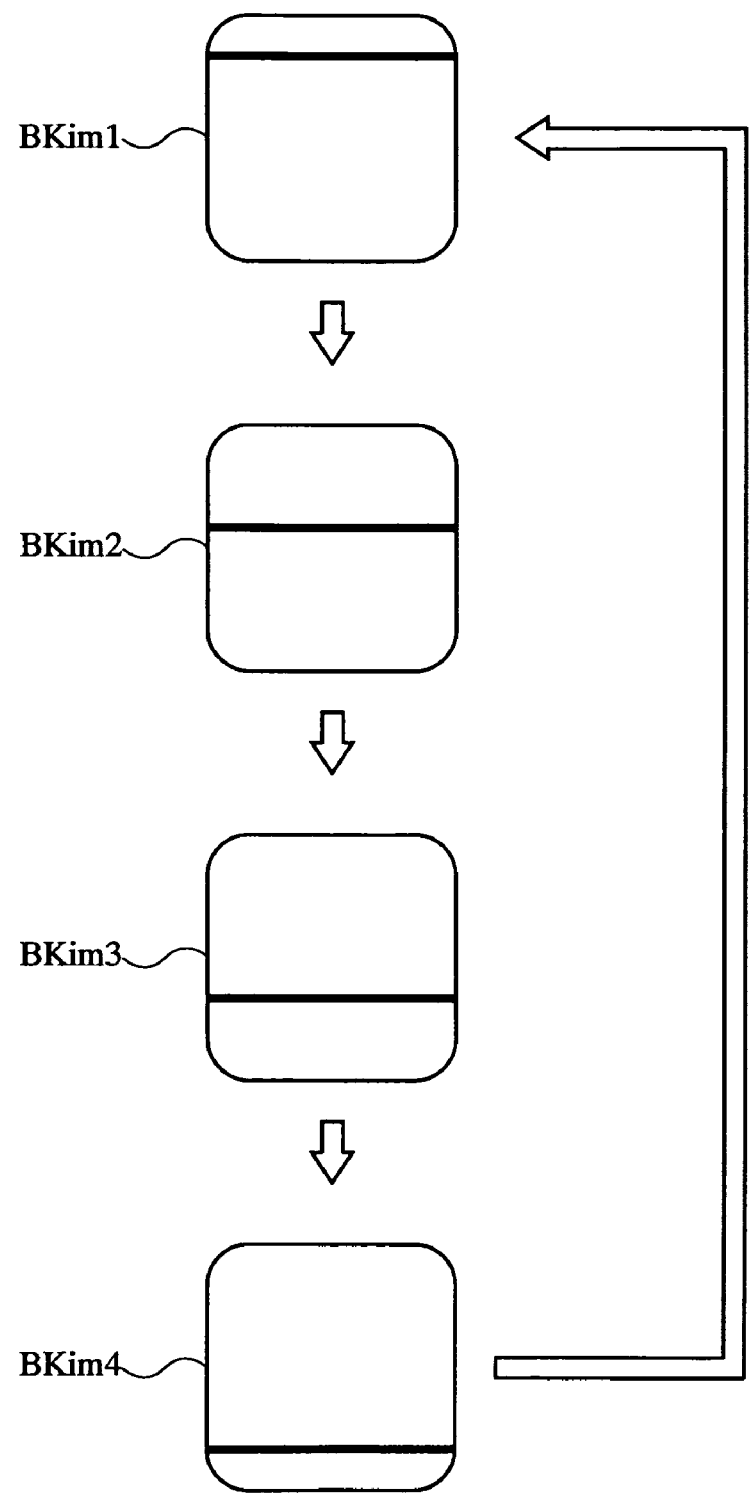
FIG. 12 shows an example of sequential change of block images BKim of different patterns from BKim1 through BKim4 to present an animation display.
Figure 13:
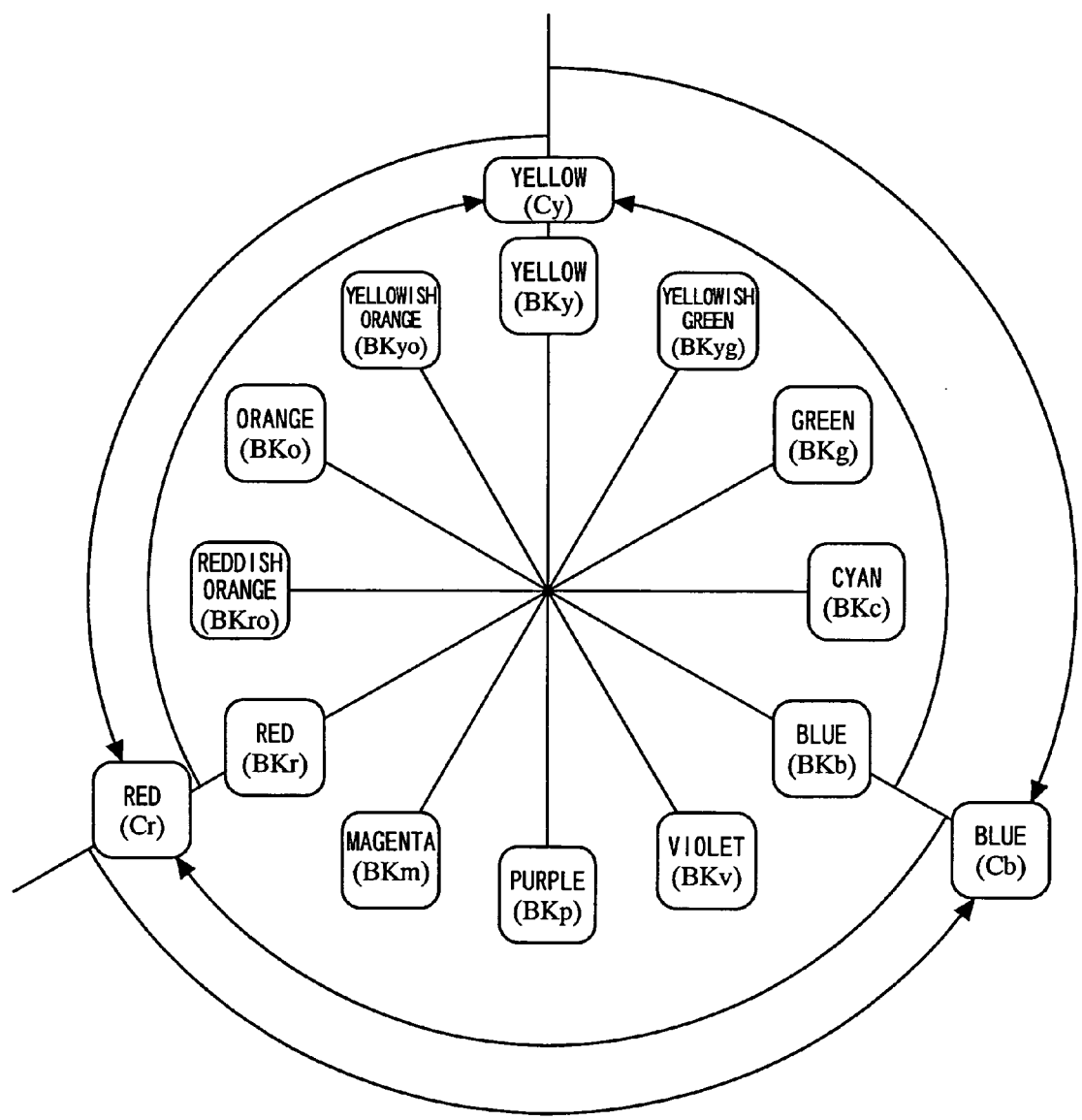
FIG. 13 shows an example of color change of the blocks BK when the cursor C is displayed in one of three different colors as a cursor Cy, Cb or Cr.

Before describing specific game processing executed by the game apparatus 10, examples of the game screen displayed on the screen of the LCD 12 by the game processing will be described with reference to FIG. 4 through FIG. 14. FIG. 4 shows an example of the game screen displayed on the screen of the LCD 12 by the game processing executed by the game apparatus 10. FIG. 5 shows an example of the game screen representing how the cursor C is moved to the block BK, the color of which is to be changed. FIG. 6 shows an example of the game screen representing how the color of the block BK is changed when a color change operation is performed. FIG. 7 shows an example of the game screen representing the erasure of blocks BK and blocks BKd which are about to fall down. FIG. 8 shows an example of the game screen representing the blocks BKd which have fallen down and blocks BKn newly appearing at the top of the game screen. FIG. 9 shows an example of the game screen representing the cursor C, the color of which has been changed, and an obstructing block BKx. FIG. 10 shows an example of color change of the blocks BK when the cursor C is displayed in one of two different colors as a cursor Cy or Cb. FIG. 11 shows an example of the block color display change table data D4 which describes the color change of the blocks BK shown in FIG. 10. FIG. 12 shows an example of sequential change of block images BKim of different patterns from BKim1 through BKim4 to present an animation display. FIG. 13 shows an example of color change of the blocks BK when the cursor C is displayed in one of three different colors as a cursor Cy, Cb or Cr. FIG. 14 shows an example of the block color display change table data D4 which describes the color change of the blocks BK shown in FIG. 13. In FIG. 4 through FIG. 9, the color of each block BK is represented by the term representing the color in the block BK.

As shown in FIG. 4, the game screen on the screen of the LCD 12 displays a plurality of blocks BK and one cursor C. For example, on the game screen shown in FIG. 4, 16 blocks (4 rows×4 columns) are displayed. The blocks BK are box-shaped objects of the same size. On the game screen, the blocks BK are displayed as two-dimensional rectangular objects. Each block BK is displayed in one color selected from a plurality of colors. In the example shown in FIG. 4, each block is displayed in one color selected from five colors of yellow, yellowish green, green, cyan and blue. The blocks BK are defined to naturally fall downward in accordance with the physical law on the game screen. For example, when any blocks BK are erased, the blocks BK located above the erased blocks BK move downward so as to fill the space or gap of the erased blocks BK. In addition, new supplemental blocks BK of the same number as the number of erased blocks BK fall down from above, so that 16 blocks BK (4 rows×4 columns) are displayed on the game screen again. As described later, the color of each block BK can be changed by the operation by the player. When a block BK is initially located or newly supplemented, however, the color of such a block is randomly determined.

The cursor C moves in accordance with an operation signal obtained by the operation on the operation switch (cross-shaped switch) 13a by the player. Typically, the cursor C is guided by the player to such a position as to surround any one block BK. In the example shown in FIG. 4, the cursor C is located so as to surround the green block BK located at row 2, column 4. The color of the cursor C changes in accordance with a predetermined condition. The cursor C can be displayed in, for example, yellow or blue.

In the puzzle game of this embodiment, when at least a predetermined number of (for example, three) blocks BK of the same color are continuously arranged vertically or horizontally, such blocks BK are erased. The competition is about how many blocks BK, or how fast the blocks BK, are erased. In the example shown in FIG. 5, yellow blocks BKy are located at row 3, column 1 and row 3, column 3. Therefore, if the yellowish green block BKyg located at row 3, column 2 is changed to a yellow block BKy, three yellow blocks BKy are continuously arranged horizontally.

A yellow cursor Cy is located at row 2, column 3 (represented by the relatively thick line in FIG. 5). When wishing to change the color of a block BK, the player operates the operation switch 13a to move the cursor C to the position of such a block BK. In the example shown in FIG. 5, the player moves the yellow cursor Cy to the position of the yellowish green block BKyg located at row 3, column 2 (as represented by the arrow in FIG. 5).

After the yellow cursor Cy is moved to the position of the yellowish green block BKyg located at row 3, column 2 as shown in FIG. 6, the player presses the operation switch (A button) 13b. By such an operation, the color of the block BK surrounded by the cursor C is changed to be one step closer toward the color of the cursor C. In this example, the yellowish green block BKyg is surrounded by the yellow cursor Cy. Therefore, the color of the yellowish green block BKyg is changed so as to be one step closer toward yellow. As described later, the change of colors, which is defined in a plurality of steps, is set such that the color one step closer in the direction toward yellow from yellowish green is yellow. Therefore, the yellowish green block BKyg is changed to a yellow block BKy. As a result of this operation by the player, three yellow blocks BKy are continuously arranged at row 3, columns 1 through 3.

As shown in FIG. 7, when at least a predetermined number of (three in this example) blocks BK of the same color are continuously arranged vertically or horizontally, such blocks BK are erased. Accordingly, the three yellow blocks BKy at row 3, columns 1 through 3 are erased. As a result of the erasure of these blocks BKy, a space is formed at row 3, columns 1 through 3. The game is defined such that the blocks BK above the erased blocks BK naturally fall downward in accordance with the physical law. Accordingly, when the space is formed at row 3, columns 1 through 3, the blocks BK above the space move down so as to fill the space. In this case, six blocks BK at rows 1 and 2, columns 1 through 3 move down. These six blocks will be represented as blocks BKd in order to be distinguished from the other blocks BK.

As shown in FIG. 8, when the blocks BKd are moved downward so as to fill the space, new supplemental blocks BKn of the same number as the number of the erased blocks BK are generated. The blocks BKn appear from the top of the game screen in accordance with the movement of the blocks BKd, and naturally fall downward together with the blocks BKd. When the blocks BKd have reached the positions to fill the space, 16 blocks BK (4 rows×4 columns) are again displayed on the game screen, including the new blocks BKn. By such processing, the game of erasing blocks BK by changing the colors thereof proceeds. For example, when at least a predetermined number of blocks BK are erased within a predetermined period of time, the puzzle game is determined to have cleared.

As described above, the color of the cursor C changes in accordance with a condition in the course of the game. In the example shown in FIG. 9, the yellow cursor Cy has been changed to a blue cursor Cb (represented with the relatively wide white line in FIG. 9). The color of each block is selected from five colors of yellow, yellowish green, green, cyan, and blue. These five colors represent five stages in which the color changes from yellow to blue in a general color circle. In this case, as the colors of the cursor C, two colors at both of two ends of the color change of the blocks BK (i.e., yellow and blue) are set. In accordance with a condition in the course of the game, the color of the cursor C is changed to either color.

As shown in FIG. 10, in response to the pressing the operation switch 13b, the color of the block BK surrounded by the cursor C is changed so as to be one step closer to the color of the cursor C. In the case of a yellow cursor Cy, for example, the block BK surrounded by the cursor Cy is sequentially changed from a blue block BKb→a cyan block BKc→a green block BKg→a yellowish green block BKyg→a yellow block BKy by the above-described operation. The change occurs as if the initial color of the blue block BKb was gradually mixed with the color of the yellow cursor Cy. When the operation switch 13b is pressed in the state where the yellow block BKy is surrounded by the yellow cursor Cy, the color of the block BKy is not changed. In this case, it is indicated that the color of the block BKy is not to be changed by, for example, vibrating the image of the block BKy on the game screen.

In the case of a blue cursor Cb, the block BK surrounded by the cursor Cb is sequentially changed from a yellow block BKy→a yellowish green block BKyg→a green block BKg→a cyan green block BKc→a blue block BKb by the above-described operation. The change occurs as if the initial color of the yellow block BKy was gradually mixed with the color of the blue cursor Cb. When the operation switch 13b is pressed in the state where the blue block BKb is surrounded by the blue cursor Cb, the color of the block BKb is not changed. In this case, it is indicated that the color of the block BKb is not to be changed by, for example, vibrating the image of the block BKb on the game screen.

Such a change of colors is described in the block color change table data D4 shown in FIG. 11 in the game apparatus 10. Based on such a description, the block color data D33 of the block BK of interest is determined and updated. In the case of, for example, a yellow cursor Cy, the block color change table data D4 describes that a blue block BKb is changed by one color step to a cyan block BKc, a cyan block BKc is changed by one color step to a green block BKg, a green block BKg is changed by one color step to a yellowish green block BKyg, a yellowish green block BKyg is changed by one color step to a yellow block BKy, and the color of a yellow block BKy is not changed. In the case of, for example, a blue cursor Cb, the block color change table data D4 describes that a yellow block BKy is changed by one color step to a yellowish green block BKyg, a yellowish green block BKyg is changed by one color step to a green block BKg, a green block BKg is changed by one color step to a cyan block BKc, a cyan block BKc is changed by one color step to a blue block BKb, and the color of a blue block BKb is not changed.

As described above, the color of the block BK surrounded by the cursor C is changed so as to be one step closer to the color of the cursor C in response to the pressing on the operation switch 13b. Accordingly, where the cursor C is a yellow cursor Cy, the color of the block BK is changed so as to be one step closer to yellow. Where the cursor C is a blue cursor Cb, the color of the block BK is changed so as to be one step closer to blue. For example, it is assumed that on the game screen shown in FIG. 6, the color of the cursor is blue (the cursor Cb) instead of yellow. When the player presses the operation switch 13b in this state, the color of a yellowish green block BKyg is changed to be one step closer toward blue; i.e., the block BKyg is changed to a green block BKg. Depending on the color of the cursor C, the player may not be able to change the color of a block BK to a desired color. The player needs to consider how to proceed with the puzzle game in consideration of the color of the cursor C as well as in mere consideration of the colors of the blocks BK.

As shown in FIG. 9, a block BK is sometimes displayed in an achromatic color such as gray or black (block BKx shown in FIG. 9), which is different from the five-stage colors changing from yellow to blue. The block BKx is set as an obstructing block, the color of which cannot be changed by the above-described operation. According to the general color concept, achromatic colors such as gray and black cannot be changed to be closer to a chromatic color such as yellow or blue even when being mixed with yellow or blue. An obstructing block BKx, the color of which cannot be changed, is displayed in an achromatic color, so that the player can easily recognize that this is the obstructing block, the color of which cannot be changed by operating the cursor C. For example, a block BK which has not been moved for a predetermined time duration may be changed to an obstructing block BKx. An obstructing block BKx can be erased under a different condition from that of the other blocks BK; for example, under the condition that an obstructing block BKx is erased in a chain reaction manner when a predetermined number of blocks BK in the vicinity thereof are erased.

As shown in FIG. 12, for a block image BKim of the block BK displayed on the screen of the LCD 12, a plurality of patterns are prepared. In the example shown in FIG. 12, four patterns of block images BKim1 through BKim4 are prepared. The block images BKim are sequentially changed from BKim1 to BKim4 (as represented by the arrows in FIG. 12) in accordance with the display form change speed data D34 to present an animation display. Specifically, the speed at which the block images BKim are changed from BKim 1 through BKim4 becomes faster as the time passes. The display form change speed data D34 is initialized by the movement of a block BK. Namely, the speed at which the display form of an image of a block BK which has not been moved for an extended time duration is relatively fast. Therefore, the player can distinguish the blocks BK which he/she has not moved for an extended time duration based on the speed at which the image patterns of each block BK are changed. As described above, a block BK which has not been moved for a predetermined time duration is changed to an obstructing block BKx. Therefore, the player can find which block BK has a risk of being changed to an obstructing block BKx based on the speed at which the image patterns of each of the plurality of blocks BK are changed.

In the above embodiment, the cursor C is displayed on one of two different colors as a cursor Cy or Cb in the puzzle game. Alternatively, a cursor C which is displayed in one of three different colors may also be used. For example, as shown in FIG. 13, each block BK is displayed in one of twelve colors of a general color circle (for example, yellow, yellowish green, green, cyan, blue, violet, purple, magenta, red, reddish orange, orange, and yellowish orange). The cursor C is displayed in one of three colors selected from the above-mentioned twelve colors (for example, yellow, blue and red). Like in the above embodiment, the color of the block BK surrounded by the cursor C is changed so as to be one step closer to the color of the cursor C in response to the pressing on the operation switch 13b.

In the case of, for example, a yellow cursor Cy, each block BK is sequentially changed from a blue block BKb→a cyan block BKc→a green block BKg→a yellowish green block BKkg→a yellow block BKy by the above-described operation. Also in the case of the yellow cursor Cy, each block BK is sequentially changed from a red block BKr→a reddish orange block BKro→an orange block BKo→a yellowish orange block BKyo→a yellow block BKy by the above-described operation. As described above, the change occurs as if the initial color of the blue or red block was gradually mixed with the color of the yellow cursor Cy to be the colors represented in the color circle shown in FIG. 13.

According to the general color concept, purple, which is a complementary color to yellow, is changed to gray or the like when being mixed with yellow. In this embodiment, the color change is not set such that the color of a purple block BKp, which is complementary to yellow, is changed so as to one step closer to the color of the yellow cursor BKy. Specifically, when the operation switch 13b is pressed in the state where a purple block BKp is surrounded by the yellow cursor Cy, the purple block BKp is changed to an obstructing block BKx. Also, the colors immediately before and immediately after purple in the color circle shown in FIG. 13 (i.e., violet and magenta) are set to be complementary to yellow. In other words, three colors, i.e., the exact complementary color to yellow and the colors sandwiching the exact complementary color, are set as complementary colors. The reason for this is that if only purple is set to be complementary to yellow, it is not clear to the player whether or not the colors close to purple are complementary, or in which direction the color will change. Accordingly, even when the operation switch 13b is pressed in the state where a violet block BKv or a magenta block BKm is surrounded by the yellow cursor Cy, each of the blocks BKv and the BKm is changed to an obstructing block BKx.

In the case of, for example, a blue cursor Cb, each block BK is sequentially changed from a yellow block BKy→a yellowish green block BKyg→a green block BKg→a cyan block BKc→a blue block BKb by the above-described operation. Also in the case of the blue cursor Cb, each block BK is sequentially changed from a red block BKr→a magenta block BKm o a purple block BKp→a violet block BKv→a blue block BKb by the above-described operation. As described above, the change occurs as if the initial color of the yellow or red block was gradually mixed with the color of the blue cursor Cb to be the colors represented in the color circle shown in FIG. 13.

Similar to the relationship between yellow and purple, orange, which is a complementary color to blue, is changed to gray or the like when being mixed with blue. In this embodiment, the color change is not set such that the color of an orange block BKo, which is complementary to yellow, and the colors of a reddish orange block BKro and a yellowish orange block BKyo, which are immediately before and immediately after orange, are changed so as to one step closer to the color of the blue cursor BKb. Specifically, when the operation switch 13b is pressed in the state where a reddish orange block BKro, an orange block BKo or a yellowish orange block BKyo is surrounded by the blue cursor Cb, each of these blocks is changed to an obstructing block BKx. As in the case of the yellow cursor Cy, three colors, i.e., the exact complementary color to blue and the colors sandwiching the exact complementary color, are set as complementary colors.

In the case of, for example, a red cursor Cr, each block BK is sequentially changed from a blue block BKb→a violet block BKv→a purple block BKp→a magenta block BKm→a red block BKr by the above-described operation. Also in the case of the red cursor Cr, each block BK is sequentially changed from a yellow block BKy→a yellowish orange block BKyo→an orange block BKo→a reddish orange block BKro→a red block BKr by the above-described operation. As described above, the change occurs as if the initial color of the blue or yellow block was gradually mixed with the color of the red cursor Cr to be the colors represented in the color circle shown in FIG. 13.

Similar to the relationship between yellow and purple and the relationship between blue and orange, green, which is a complementary color to red, is changed to gray or the like when being mixed with red. In this embodiment, the color change is not set such that the color of a green block BKg, which is complementary to red, and the colors of a yellowish green block BKyg and a cyan block BKc, which are immediately before and immediately after green, are changed so as to one step closer to the color of the red cursor BKr. Specifically, when the operation switch 13b is pressed in the state where a yellowish green block BKyg, a green block BKg or a cyan block BKc is surrounded by the red cursor Cr, each of these blocks is changed to an obstructing block BKx. As in the case of the yellow cursor Cy and the blue cursor Cb, three colors, i.e., the exact complementary color to red and the colors sandwiching the exact complementary color, are set as complementary colors.

The color change shown in FIG. 13 is described in the block color change table data D4 shown in FIG. 14 in the game apparatus 10. Based on such a description, the block color data D33 of the block BK of interest is determined and updated. In the case of, for example, a yellow cursor Cy, the block color change table data D4 describes that a blue block BKb is changed by one color step to a cyan block BKc, a cyan block BKc is changed by one color step to a green block BKg, a green block BKg is changed by one color step to a yellowish green block BKyg, a yellowish green block BKyg is changed by one color step to a yellow block BKc, and the color of a yellow block BKc is not changed. In the case of the yellow cursor Cy, the block color change table data D4 describes that a red block BKr is changed by one color step to a reddish orange block BKro, a reddish orange block BKro is changed by one color step to an orange block BKo, an orange block BKo is changed by one color step to a yellowish orange block BKyo, and a yellowish orange block BKyo is changed by one color step to a yellow block BKc. Also in the case of the yellow cursor Cy, the block color change table data D4 describes that a violet block BKv, a purple block BKp and a magenta block BKm are each changed to an obstructing block BKx.

In the case of, for example, a blue cursor Cb, the block color change table data D4 describes that a yellow block BKy is changed by one color step to a yellowish green block BKyg, a yellowish green block BKyg is changed by one color step to a green block BKg, a green block BKg is changed by one color step to a cyan block BKc, a cyan block BKc is changed by one color step to a blue block BKb, and the color of a blue block BKb is not changed. In the case of the blue cursor Cb, the block color change table data D4 describes that a red block BKr is changed by one color step to a magenta block BKm, a magenta block BKm is changed by one color step to a purple block BKp, a purple block BKp is changed by one color step to a violet block BKv, and a violet block BKv is changed by one color step to a blue block BKb. Also in the case of the blue cursor Cb, the block color change table data D4 describes that a reddish orange block BKro, an orange block BKo and a yellowish orange block BKyo are each changed to an obstructing block BKx.

In the case of, for example, a red cursor Cr, the block color change table data D4 describes that a blue block BKb is changed by one color step to a violet block BKv, a violet block BKv is changed by one color step to a purple block BKp, a purple block BKp is changed by one color step to a magenta block BKm, a magenta block BKm is changed by one color step to a red block BKr, and the color of a red block BKr is not changed. In the case of the red cursor Cr, the block color change table data D4 describes that a yellow block BKy is changed by one color step to a yellowish orange block BKyo, a yellowish orange block BKyo is changed by one color step to an orange block BKo, an orange block BKo is changed by one color step to a reddish orange block BKro, and a reddish orange block BKro is changed by one color step to a red block BKr. Also in the case of the red cursor Cr, the block color change table data D4 describes that a yellowish green block BKyg, a green block BKg and a cyan block BKc are each changed to an obstructing block BKx.

As described above, even where the cursor C is displayed in one of three colors, the color of each block BK is changed so as to be one step closer to the color of the cursor C in response to the pressing on the operation switch 13b, as in the case where the cursor C is displayed in one of two colors. Accordingly, where the cursor C is a yellow cursor Cy, the color of each block BK is changed so as to be one step closer to yellow; where the cursor C is a blue cursor Cb, the color of each block BK is changed so as to be one step closer to blue; and where the cursor C is a red cursor Cr, the color of each block BK is changed so as to be one step closer to red. As compared to the case where the cursor C is displayed in one of two colors, the color of each block BK is changed in a wider variety of manners depending on the color of the cursor C, and thus it becomes more difficult for the player to change the color of each block BK to a desired color. The player needs to proceed with the puzzle game in consideration of the color of the cursor C as well as in mere consideration of the colors of the blocks BK. In the above embodiments, the cursor C is displayed in one color selected from two or three colors. Alternatively, the cursor C may be displayed in one color selected from four or more colors. Each block BK may be displayed in one of a greater number of colors than described above. In such manners, the difficulty level of the puzzle game can be increased, needless to say.

Figure 15:
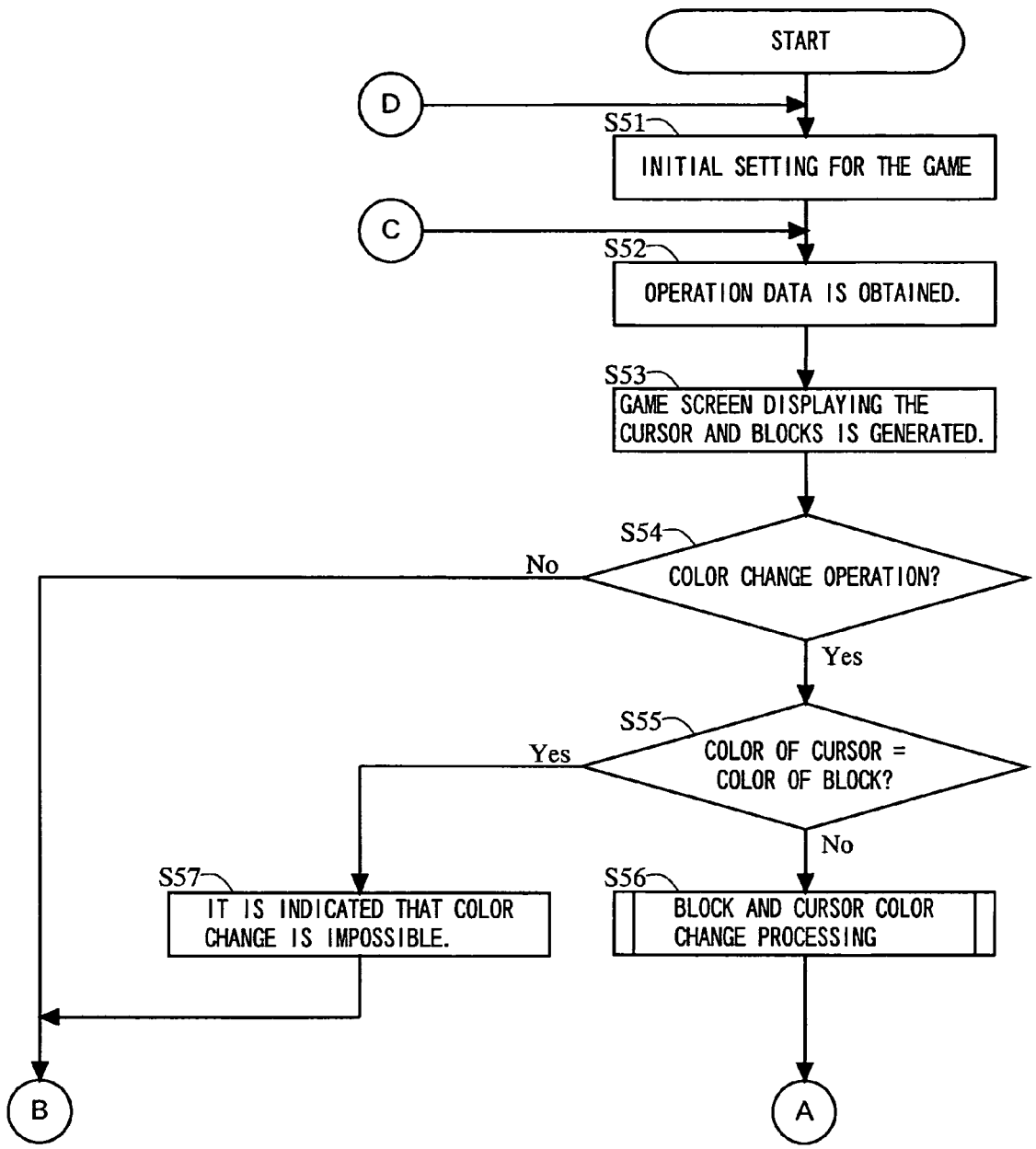
FIG. 15 is a flowchart of a first half of the game processing executed by the game apparatus 10 shown in FIG. 1.
Figure 16:
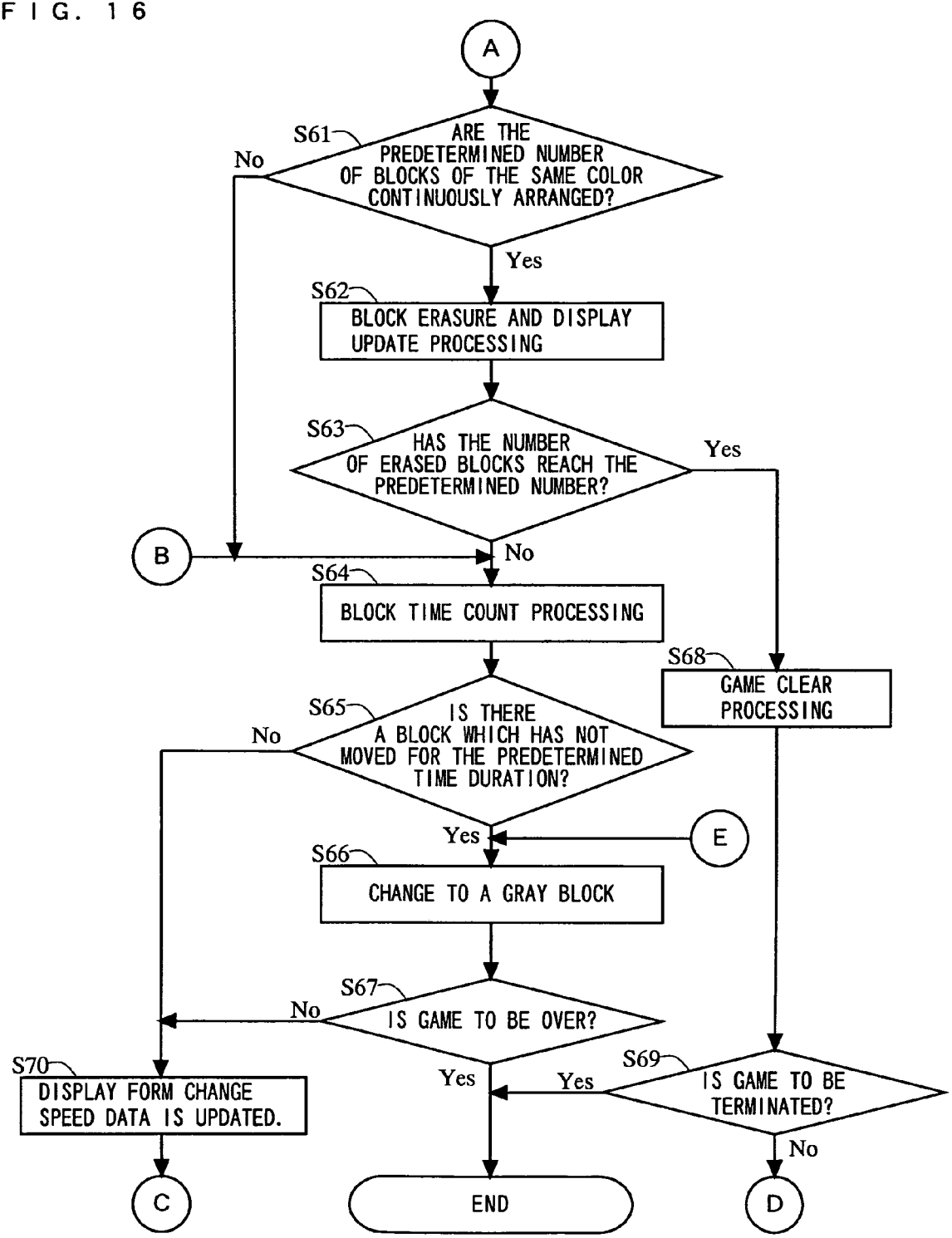
FIG. 16 is a flowchart of a second half of the game processing executed by the game apparatus 10 shown in FIG. 1.
Figure 17:
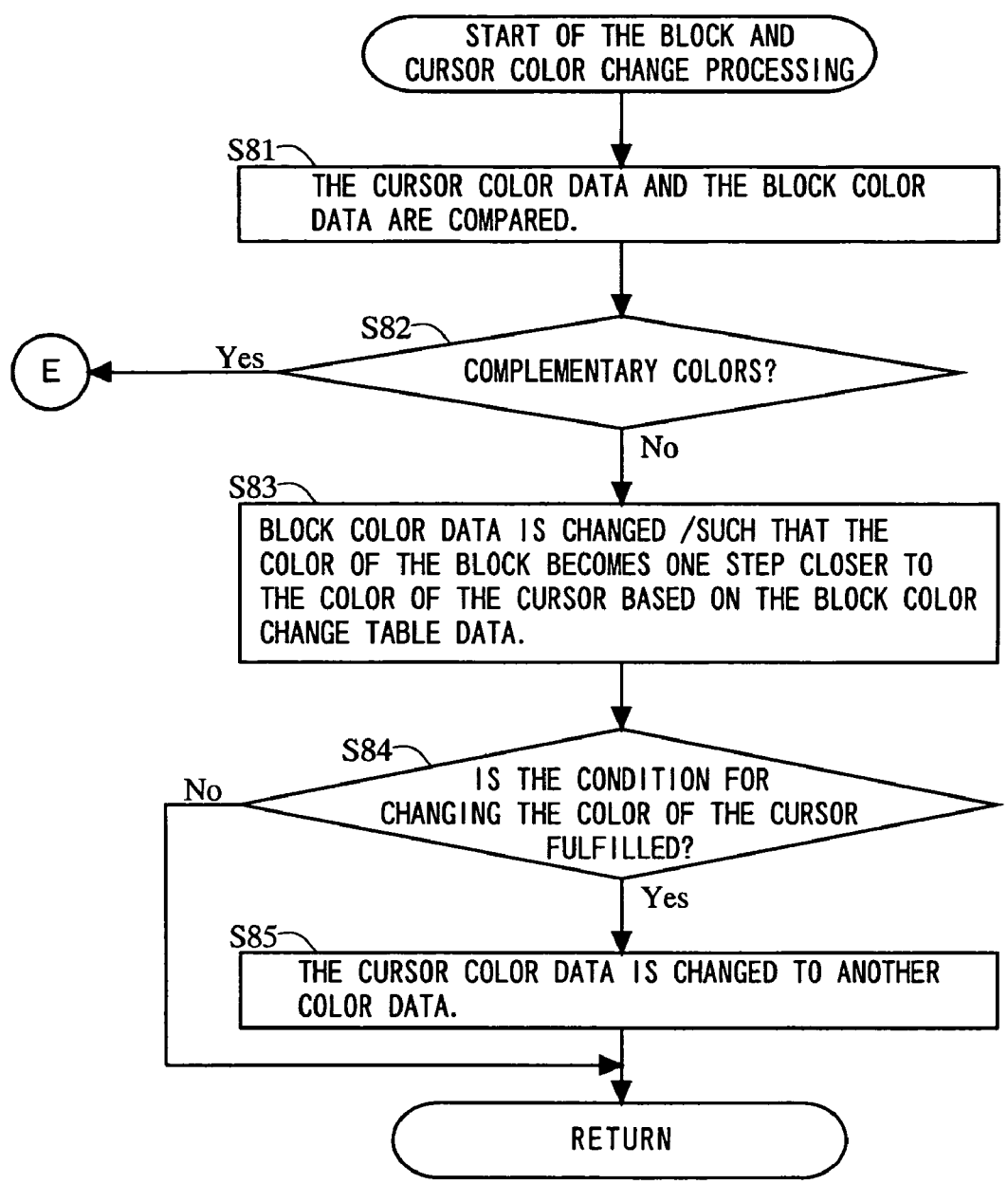
FIG. 17 shows a subroutine illustrating detailed processing in step 56 shown in FIG. 15.

Next, with reference to FIG. 15 through FIG. 17, the game processing executed by the game apparatus 10 will be described. FIG. 15 is a flowchart illustrating a first half of the game processing executed by the game apparatus 10. FIG. 16 is a flowchart illustrating a second half of the game processing executed by the game apparatus 10. FIG. 17 shows a subroutine illustrating the detailed processing performed in step 56 in FIG. 15. The program for executing such processing is included in the game program stored on the program ROM 21, and is read from the program ROM 21 to the WRAM 32 when the game apparatus 10 is powered on, and is executed by the CPU 31.

When the power supply (not shown) of the game apparatus 10 is turned on, the CPU 31 executes the boot program (not shown), and thus the game program stored on the cartridge 20 is loaded onto the WRAM 32 (see FIG. 3). By the CPU 31 processing the loaded game program, the steps shown in FIG. 15 and FIG. 16 (the steps will be simply referred to as "S" in FIG. 15 through FIG. 17) are executed.

As shown in FIG. 15, the CPU 31 performs initial setting for the game (step 51) and advances the processing to the next step. The initial setting performed by the CPU 31 in step 51 includes determination of the number of rows and columns of the blocks BK displayed on the game screen (for example, 4 rows×4 columns=16 blocks), the colors in which each block BK can be displayed (for example, the five colors shown in FIG. 10 or the twelve colors shown in FIG. 13), and the colors in which the cursor C can be displayed (for example, the two colors shown in FIG. 10 or the three colors shown in FIG. 13). These factors determine the difficulty level of the puzzle game to be played. The CPU 31 sets the color and position of each of a plurality of blocks BK and the color and position of the cursor C on the game screen, and initializes the data stored in the operation data buffer D1. The CPU 31 also initializes the timer count data D5 for each block BK and starts the counting by the timer count program P9. Such initial setting is performed by updating the data stored in the data storage area 322, such as the cursor display data D2 and the block display data D3.

Next, the CPU 31 obtains operation data generated as a result of the operation on one of the operation switches 13 by the player, and stores the operation data in the operation data buffer D1 (step 52). Then, the CPU 31 generates a game screen by arranging the image data for the blocks BK and the cursor C corresponding to the current state of the game based on the corresponding color data and position data, and performs the control of displaying the game screen on the screen of the LCD 12 (step 53; see FIG. 4 through FIG. 9). Then, the CPU 31 advances the processing to the next step. In step 53, the CPU 31 performs the control of displaying the cursor C in a color based on the RGB values derived from the cursor color data D22. The CPU 31 performs the control of displaying each block BK in a color based on the RGB values derived from the block color data D33. The CPU 31 changes the block images BKim of a plurality of patterns (block image data D32) in real time based on the display form change speed data D34, such that the display form of each block BK is changed for the presentation of an animation display at a speed represented by the display form change speed data D34 (see FIG. 12).

Next, the CPU 31 determines whether or not the operation data obtained in step 52 represents a color change operation (step 54). For example, when the CPU 31 obtains the operation data as a result of the pressing on the operation switch (A button) 13b by the player, the CPU 31 determines that the operation data represents the color change operation. When the operation data represents the color change operation, the CPU 31 advances the processing to step 55. When not, the CPU 31 advances the processing to step 64 (FIG. 16).

In step 55, the CPU 31 determines whether the current color of the cursor C (cursor color data D22) and the color of the block BK surrounded by the cursor C (block color data D33) are the same or not. When the colors are the same, the CPU 31 learns by referring to block color change table data D4 (see FIG. 11 and FIG. 14) that the color of the block BK is not to be changed. In this case, the CPU 31 performs the control of indicating on the game screen that the color of the block BK is not to be changed (step 57), and advances the processing to step 64 (FIG. 16). By the processing in step 57, the cursor C and the block BK surrounded by the cursor C appear vibrating on the game screen displayed on the screen of the LCD 12 of the game apparatus 10. When the current color of the cursor C is different from the color of the block BK surrounded by the cursor C, the CPU 31 performs block and cursor color change processing (step 56), and advances the processing to step 61 (FIG. 16). With reference to FIG. 17, the processing in step 56 will be described in detail.

As shown in FIG. 17, the CPU 31 compares the current color of the cursor C (cursor color data D22) and the color of the block BK surrounded by the cursor C (block color data D33), and refers to the description in the block color change table data D4 regarding the combination of the colors (step 81). The CPU 31 determines whether or not the colors are complementary to each other (step 82). When the colors are complementary to each other, the CPU 31 advances the processing to step 66 (FIG. 16). When they are not, the CPU 31 advances the processing to step 83. For example, in the case where the block color change table data D4 shown in FIG. 14 is used, the CPU 31 determines that the colors are complementary to each other when, for example, the cursor C is a yellow cursor Cy and the block is a violet block BKv, a purple block BKp or a magenta block BKm. Specifically, the CPU 31 determines that the colors are complementary to each other when the color of the block BK is described to be changed to an obstructing block BKx in the block color change table data D4. In the case where the block color change table data D4 shown in FIG. 11 is used, there is no combination of colors with which the color of the block BK is to be changed to an obstructing block BKx. Therefore, the CPU 31 advances the processing to step 83 for any combination of colors.

In step 83, the CPU 31 changes and updates the block color data D33 of the block BK surrounded by the cursor C such that the color of the block BK becomes one step closer to the color of the cursor C, based on the block color change table data D4. How the color of the block BK is changed is already described above with reference to FIG. 10, FIG. 11, FIG. 13 and FIG. 14, and will not be described here again. Then, the CPU 31 advances the processing to the next step.

Next, the CPU 31 determines whether or not the current state of the game fulfills the condition for changing the color of the cursor C (step 84). When the current state of the game fulfills the condition, the CPU 31 changes and updates the cursor color data D22 to another cursor color data D22 (for example, blue→yellow) (step 85). Thus, the CPU 31 terminates the processing of this subroutine. When the current state of the game does not fulfill the condition, the CPU 31 terminates the processing of this subroutine without further processing.

There are various possible conditions for changing the color of the cursor C in steps 84 and 85. In a first example, it is randomly determined whether the color can be changed or not. According to this method, the color of the cursor C is randomly changed each time the processing in step 84 is executed. In this case, the player cannot predict at all when the color of the cursor C will be changed. In a second example, the color of the cursor C is changed in accordance with the number of times by which the operation data representing the color change operation is obtained (Yes in step 54). In this case, the player can predict when the color of the cursor C will be changed, and therefore can enjoy the puzzle game with a strategy in consideration of the color change of the cursor C. In a third example, the color of the cursor C is changed in accordance with the number of blocks BK erased by the processing described later. In this case, the player can predict to some extent when the color of the cursor C will be changed because the color of the cursor C will not be changed until a block BK is erased. Therefore, the difficulty level of the puzzle game is relatively low.

With reference to FIG. 16, after the processing in step 56 is executed, the CPU 31 determines whether or not at least a predetermined number of (for example, three) blocks BK of the same color are continuously arranged vertically or horizontally (step 61; see FIG. 6). When at least the predetermined number of blocks BK of the same color is continuously arranged, the CPU 31 advances the processing to step 62. When it is not, the CPU 31 advances the processing to step 64.

In step 62, the CPU 31 erases the at least the predetermined number of blocks BK determined to be continuously arranged in step 61, and executes display update processing corresponding to the erasure (see FIG. 7 and FIG. 8). Then, the CPU 31 advances the processing to the next step. Specifically, when erasing the blocks BK, the CPU 31 deletes the block display data D3 regarding the corresponding blocks BK and adds the number of erased blocks BK to the erased block number count data D6. The CPU 31 updates the display map data D31 such that the blocks BKd above the space generated by the erasure naturally fall downward to the space in accordance with the physical law. The CPU 31 also generates new block display data D4 such that new blocks BKn of the same number as the number of the erased blocks BK appear at the top of the game screen, and updates the display map data D31 such that the new blocks BKn also naturally fall downward. The block color data D33 for the new blocks BKn is randomly set. The display form change speed data D34 for the new blocks BKn and the blocks BKd moved in step 62 is initialized. Instead of generating the new block display data D4, the block display data D3 for the erased blocks BK may be overwritten with the new block display data D4.

Then, the CPU 31 refers to the number represented by the erased block number count data D6 and determines whether or not the number of erased blocks BK has reached a predetermined number (step 63). When the counted number has not reached the predetermined number, the CPU 31 advances the processing to step 64. When the counted number has reached the predetermined number, the CPU 31 advances the processing to step 68.

In step 64, the CPU 31 executes block time count processing to update the timer count data D5 for a unit time. Then, the CPU 31 determines whether or not there is a block BK which has not been moved (the display of which has not been updated) for a predetermined time duration based on the timer count data D5 (step 65). When there is such a block BK, the CPU 31 advances the processing to step 66. When there is no such block BK, the CPU 31 updates the display form change speed data D34 for each block BK such that the speed is increased by a predetermined degree (step 70), and returns the processing to step 52 for repeating the above-described processing.

In step 66, the CPU 31 changes a block BK determined in step 65 as not having been moved for the predetermined time duration, or a block BK determined in step 82 as having a complementary color to the color of the cursor C, to a gray obstructing block BKx (see FIG. 9). Specifically, in order to change such a block BK into a gray obstructing block BKx, the CPU 31 changes the block color data D33 for the block BK of interest. The CPU 31 does not set the display form change speed data D34 for a gray obstructing block BKx. Next, the CPU 31 determines whether the current state of the game fulfills the condition for terminating the game or not (step 67). For example, when a great number of obstructing blocks BK appear and it becomes impossible to continuously arrange the predetermined number of blocks BK of the same color, the CPU 31 determines that current state of the game fulfills the condition. In this case, the CPU 31 terminates the processing of the flowchart. When the current state of the game does not fulfill the condition, the CPU 31 advances the processing to step 70.

When the number of erased blocks BK has reached the predetermined number in step 63, the CPU 31 determines that the player cleared the stage of the puzzle game and executes game clear processing (step 68). When the game is to be continued, the CPU 31 returns the processing to step 52 for repeating the above-described processing. When the game is to be terminated, the CPU 31 terminates the processing of the flowchart.

As described above, the game apparatus for executing the game program according to one embodiment of the present invention can present a puzzle game which can be played with a new rule, i.e., a game in which the color of each block BK is changed so as to be closer to the color of the cursor C in response to a predetermined operation, and when a certain number of blocks of the same color are continuously arranged, these blocks are erased. With such a game, the colors of the blocks BK are changed with respect to the color of the cursor C with certain regularity. Therefore, the player can enjoy the game with a new type of fun of solving the puzzle while predicting the color change of the blocks BK to some extent. The player can easily change the color of a block BK merely by putting the cursor C on the block BK, using the cross-shaped switch, and pressing the A button. The puzzle game is sufficiently easy to be enjoyed even by a beginner. The color of the cursor C acts as an indicator which shows in which direction the colors of the blocks BK are to be changed, but the colors of the blocks BK cannot be made the same easily because the color of the cursor C also changes. In the process of changing the colors of the blocks BK, an obstructing block BKx appears depending on time or whether the color of the block BK is complementary to the color of the cursor C or not. This can provide the player with a new type of feeling that he/she is running out of time because an obstructing block BKx may appear in any minute. The player needs to play the game in consideration of the color of the cursor C as well as in mere consideration of the colors of the blocks BK, which makes the puzzle game more exciting to play.

In the above description of the game processing, specific colors are used for providing the specificity. The above-mentioned colors are merely exemplary and do not limit the present invention in any way.

In the above description of the game processing with reference to the flowcharts, the display form change speed data D34 for a block BK is initialized in the initial setting step (S51) and when a new block BKn is generated and a block BKd is moved (S62). The display form change speed data D34 may be initialized in any other steps. For example, the display form change speed data D34 may be initialized when the color of a block BK is changed (S83).

In the above description, the game screen is displayed in one of a plurality of colors. The present invention is applicable to, for example, a monochrome game screen as shown in, for example, FIG. 18. FIG. 18 shows an example of color (brightness) change of a block BK when the cursor is displayed in either black or white.

In the example shown in FIG. 18, the blocks are each displayed in an achromatic color. Therefore, the color change is represented as a change in the brightness from white to black. Specifically, each block BK is changed in five brightnesses, i.e., white, light gray, intermediate gray, dark gray, and black. Each block BK is displayed in one of the five brightnesses. In this case, the cursor C is also displayed in an achromatic color. The cursor C is displayed in one of two brightnesses at both of two ends of the brightness change of the block BK (i.e., white and black). The cursor C is changed to white or black in accordance with a condition in the course of the game.

As shown in FIG. 10, the brightness of the block BK surrounded by the cursor C is changed so as to be one step closer to the brightness of the cursor C in response to the pressing on the operation switch 13b. In the case of a white cursor C, the brightness of the block BK surrounded by the cursor C is changed from black→dark gray→intermediate gray→light gray→white by the above-described operation. The change occurs as if the initial brightness of the block BK is made gradually closer to the brightness of the cursor C. When the operation switch 13b is pressed in the state where a white block BK is surrounded by the white cursor C, the brightness is not changed.

In the case of a black cursor C, the brightness of the block BK surrounded by the cursor C is changed from white→light gray→intermediate gray→dark gray→black by the above-described operation. The change occurs as if the initial brightness of the block BK is made gradually closer to the brightness of the cursor C. When the operation switch 13b is pressed in the state where a black block BK is surrounded by the black cursor C, the brightness is not changed.

As described above, even where the cursor and the blocks are displayed in an achromatic color on the game screen, the present invention can be realized by substantially the same processing as in the case of the above-described color representation, i.e., by changing the brightness of the cursor and the blocks instead of changing the color thereof. In the example shown in FIG. 18, the blocks are changed from white to black or vice versa. Alternatively, the blocks may be changed in different manners according to the present invention. For example, the blocks may be changed from white to a chromatic color (for example, red). In this case also, the brightness of each block is changed.

Needless to say, the game played by executing the game program according to the present invention can be played as a competition game. For example, after a first player successfully erases a certain number of blocks, the same number of blocks of a second player (opponent) can be changed to obstructing blocks. In this manner, the game can be a competition game. If the difficulty level of the game is too high, the game can be made easier by, for example, deleting the rule that the puzzle elements are changed to obstructing blocks after predetermined time duration.

The present invention provides a storage medium having a game program stored therein and a game apparatus for executing such a game program, which can present a puzzle game of erasing puzzle elements by making the colors of the puzzle elements the same. The present invention is applicable to a game enjoyable using a displayed game screen.

While the invention has been described in detail, the foregoing description is in all aspects illustrative and not restrictive. It is understood that numerous other modifications and variations can be devised without departing from the scope of the invention.

What is claimed is:

1. A storage medium storing a game program executable by a computer of a game apparatus for displaying a game screen on display means in accordance with an operation signal which is output from operation means operated by a player, the game program causing the computer to execute:
 a puzzle element color setting step, setting a color selected from a plurality of preset colors as a color of each of a plurality of puzzle elements, and storing data representing the color on a memory;
 a puzzle element display step, allocating the plurality of puzzle elements to a predetermined area and displaying each of the plurality of puzzle elements in the color set therefor on the display means;
 a cursor color setting step, setting a color selected from the plurality of preset colors indicated by a color of a cursor for selecting one of the plurality of puzzle elements located in the predetermined area, and storing data representing the color on a memory;
 a cursor display step, allocating the cursor at a position corresponding to the operation signal and displaying the cursor in the color set therefor on the display means;
 a puzzle element color changing step, when the cursor is located at the position corresponding to one of the plurality of puzzle elements selected by the cursor and a predetermined operation signal is input from the operation means, changing the color of the puzzle element selected by the cursor based on the color of the cursor and the color of the puzzle element;
 a cursor color changing step, changing the color of the cursor to another color selected from the plurality of preset colors based on a predetermined condition; and
 a puzzle element display updating step, when at least a predetermined number of continuously arranged puzzle elements among the plurality of puzzle elements allocated in the predetermined area are of the same color, erasing the continuously arranged puzzle elements, arranging new puzzle elements in the predetermined area each in a color selected from the plurality of preset colors, and displaying the new puzzle elements on the display means.

2. A storage medium according to claim 1, wherein the puzzle element color changing step includes the step of changing the color of the puzzle element selected by the cursor to a color which is selected from the plurality of preset colors and is closer to the color of the cursor than the color currently set for the puzzle element.

3. A storage medium according to claim 2, wherein:
the cursor color setting step and the cursor color changing step include the step of selecting a color from any two colors among the plurality of preset colors as a color of the cursor; and
the puzzle element color setting step and the puzzle element color changing step include the step of selecting a color, as a color of the puzzle element selected by the cursor, from the two colors selected by the cursor color setting step and the cursor color changing step and another color among the plurality of preset colors which is median between the two colors.

4. A storage medium according to claim 2, wherein:
a plurality of the preset colors have a relationship of forming a color circle;
the cursor color setting step and the cursor color changing step include the step of selecting a color from any three colors among the plurality of preset colors in the color circle as a color of the cursor; and
the puzzle element color setting step and the puzzle element color changing step include the step of selecting a color from all the plurality of preset colors in the color circle as a color of the puzzle element selected by the cursor.

5. A storage medium according to claim 4, wherein:
the puzzle element color changing step includes the step of, when the color of the cursor and the color of the puzzle element selected by the cursor are complementary to each other in the color circle, changing the color of the puzzle element selected by the cursor to an achromatic color which is different from any of the plurality of preset colors in the color circle; and
the game program further causes the computer to execute a puzzle element state changing step changing the puzzle element which has been changed to have the achromatic color to a puzzle element, the color of which cannot be changed by the puzzle element color changing step.

6. A storage medium according to claim 1, wherein the puzzle element color changing step includes the step, when the color of the cursor and the color of the puzzle element selected by the cursor are the same as each other, keeping the color of the puzzle element selected by the cursor unchanged.

7. A storage medium according to claim 1, wherein:
the puzzle element display updating step includes the step of moving other puzzle elements among the plurality of puzzle elements in a predetermined direction so as to fill a gap generated in the predetermined area by the erasure of the continuously arranged puzzle elements; and
the game program further causes the computer to execute a puzzle element state changing step, changing a puzzle element among the plurality of puzzle elements which has not been moved for at least a predetermined time duration to a puzzle element, the color of which cannot be changed by the puzzle element color changing step.

8. A storage medium according to claim 7, wherein the game program further causes the computer to execute a puzzle element state change timing display step of displaying a time at which the puzzle element is to be changed by the puzzle element state changing step on the display means.

9. A storage medium having storing a game program executable by a computer of a game apparatus for displaying a game screen on display means in accordance with an operation signal which is output from operation means operated by a player, the game program causing the computer to execute:
a puzzle element brightness setting step of setting a brightness selected from a plurality of preset brightnesses as a brightness of each of a plurality of puzzle elements, and storing data representing the brightness on a memory;
a puzzle element display step of locating the plurality of puzzle elements in a predetermined area and displaying each of the plurality of puzzle elements in the brightness set therefor on the display means;
a cursor brightness setting step of setting a brightness selected from the plurality of preset brightnesses as a brightness of a cursor for selecting one of the plurality of puzzle elements located in the predetermined area, and storing data representing the brightness on a memory;
a cursor display step of locating the cursor at a position corresponding to the operation signal and displaying the cursor in the brightness set therefor on the display means;
a puzzle element brightness changing step of, when the cursor is located at the position corresponding to one of the plurality of puzzle elements selected by the cursor and a predetermined operation signal is input from the operation means, changing the brightness of the puzzle element selected by the cursor based on the brightness of the cursor and the brightness of the puzzle element;
a cursor brightness changing step of changing the brightness of the cursor to another brightness selected from the plurality of preset brightnesses based on a predetermined condition; and
a puzzle element display updating step of, when at least a predetermined number of continuously arranged puzzle elements among the plurality of puzzle elements located in the predetermined area are of the same brightness, erasing the continuously arranged puzzle elements, arranging new puzzle elements in the predetermined area each in a brightness selected from the plurality of preset brightnesses, and displaying the new puzzle elements on the display means.

10. A game apparatus for displaying a game screen on display means in accordance with an operation signal which is output from operation means operated by a player, the game apparatus comprising:
storage means;
puzzle element color setting means for setting a color selected from a plurality of preset colors as a color of each of a plurality of puzzle elements, and storing data representing the color on a memory;
puzzle element display means for locating the plurality of puzzle elements in a predetermined area and displaying each of the plurality of puzzle elements in the color set therefor on the display means;
cursor color setting means for setting a color selected from the plurality of preset colors as a color of a cursor for selecting one of the plurality of puzzle elements located in the predetermined area, and storing data representing the color on a memory;
cursor display means for locating the cursor at a position corresponding to the operation signal and displaying the cursor in the color set therefor on the display means;
puzzle element color changing means for, when the cursor is located at the position corresponding to one of the plurality of puzzle elements selected by the cursor and a predetermined operation signal is input from the operation means, changing the color of the puzzle element selected by the cursor based on the color of the cursor and the color of the puzzle element;

cursor color changing means for changing the color of the cursor to another color selected from the plurality of preset colors based on a predetermined condition; and puzzle element display updating means for, when at least a predetermined number of continuously arranged puzzle elements among the plurality of puzzle elements located in the predetermined area are of the same color, erasing the continuously arranged puzzle elements, arranging new puzzle elements in the predetermined area in a color selected from the plurality of preset colors respectively, and displaying the new puzzle elements on the display means.

11. A game apparatus for displaying a game screen on display means in accordance with an operation signal which is output from operation means operated by a player, the game apparatus comprising:

storage means;

puzzle element brightness setting means for setting a brightness selected from a plurality of preset brightnesses as a brightness of each of a plurality of puzzle elements, and storing data representing the brightness on a memory;

puzzle element display means for locating the plurality of puzzle elements in a predetermined area and displaying each of the plurality of puzzle elements in the brightness set therefor on the display means;

cursor brightness setting means for setting a brightness selected from the plurality of preset brightnesses as a brightness of a cursor for selecting one of the plurality of puzzle elements located in the predetermined area, and storing data representing the brightness on a memory;

cursor display means for locating the cursor at a position corresponding to the operation signal and displaying the cursor in the brightness set therefor on the display means;

puzzle element brightness changing means for, when the cursor is located at the position corresponding to one of the plurality of puzzle elements selected by the cursor and a predetermined operation signal is input from the operation means, changing the brightness of the puzzle element selected by the cursor based on the brightness of the cursor and the brightness of the puzzle element;

cursor brightness changing means for changing the brightness of the cursor to another brightness selected from the plurality of preset brightnesses based on a predetermined condition; and puzzle element display updating means for, when at least a predetermined number of continuously arranged puzzle elements among the plurality of puzzle elements located in the predetermined area are of the same brightness, erasing the continuously arranged puzzle elements, arranging new puzzle elements in the predetermined area each in a brightness selected from the plurality of preset brightnesses, and displaying the new puzzle elements on the display means.

* * * * *